United States Patent
Hosseini et al.

(10) Patent No.: US 11,381,435 B2
(45) Date of Patent: Jul. 5, 2022

(54) CONFIGURATION FOR DATA AND REFERENCE SIGNAL TRANSMISSIONS WITH SHORTENED TRANSMISSION TIME INTERVALS

(71) Applicant: QUALCOMM Incorporated, San Diego, CA (US)

(72) Inventors: Seyedkianoush Hosseini, San Diego, CA (US); Wanshi Chen, San Diego, CA (US); Jing Sun, San Diego, CA (US); Peter Gaal, San Diego, CA (US); Shimman Arvind Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 154 days.

(21) Appl. No.: 15/806,812

(22) Filed: Nov. 8, 2017

(65) Prior Publication Data
US 2018/0139083 A1    May 17, 2018

Related U.S. Application Data

(60) Provisional application No. 62/421,183, filed on Nov. 11, 2016.

(51) Int. Cl.
*H04L 5/00* (2006.01)
*H04L 27/26* (2006.01)
*H04W 72/04* (2009.01)

(52) U.S. Cl.
CPC ........ *H04L 27/2613* (2013.01); *H04L 5/0048* (2013.01); *H04L 5/0053* (2013.01); *H04L 5/0094* (2013.01); *H04W 72/0413* (2013.01)

(58) Field of Classification Search
CPC . H04L 5/0048; H04L 27/2613; H04L 5/0053; H04L 5/0094; H04W 72/0413; H04W 72/04
See application file for complete search history.

(56) References Cited

U.S. PATENT DOCUMENTS

| 7,257,114 B1* | 8/2007 | Koistinen | H04L 12/6418 370/356 |
| 2008/0057994 A1* | 3/2008 | Duan | H04W 52/146 455/522 |

(Continued)

FOREIGN PATENT DOCUMENTS

| CN | 104468030 A | 3/2015 |
| CN | 104488213 A | 4/2015 |
| CN | 105340196 A | 2/2016 |

OTHER PUBLICATIONS

CATT: "Discussion on DMRS Design for sPUSCH", 3GPP Draft; R1-1611358, 3rd Generation Partnership Project (3gpp), Mobile Competence Centre, 650, Route Des Lucioles, F-06921 Sophia-Antipolis Cedex, France, vol. RAN WG1, No. Reno, USA; Nov. 5, 2016, XP051189892, Retrieved from the internet: URL:http://www.3gpp.org/ftp/tsg_ran/WG1_RL1/TSGR1_87/Docs [retrieved on Nov. 5, 2016], 8 pages.

(Continued)

*Primary Examiner* — Abdelillah Elmejjarmi
(74) *Attorney, Agent, or Firm* — Holland & Hart LLP/Qualcomm

(57) ABSTRACT

Techniques provide for identifying uplink resources that are to be used for uplink transmissions using shortened transmission time intervals (sTTIs), such as low latency or high reliability transmissions. A reference signal (RS) configuration for a three-symbol sTTI, including locations of one or more RS symbols and one or more data symbols within the sTTI may be identified. The RS configuration, along with the allocation of uplink resources, may be provided to a user equipment (UE) which may transmit uplink communications using the allocated uplink resources.

29 Claims, 18 Drawing Sheets

(56) References Cited

U.S. PATENT DOCUMENTS

| | | | | |
|---|---|---|---|---|
| 2009/0202066 | A1* | 8/2009 | Majima | H04L 1/0003 380/28 |
| 2010/0124297 | A1 | 5/2010 | Papasakellariou et al. | |
| 2011/0051621 | A1* | 3/2011 | Kwak | H04L 5/0057 370/252 |
| 2013/0114501 | A1* | 5/2013 | Kishiyama | H04J 13/0059 370/328 |
| 2014/0078982 | A1* | 3/2014 | Nammi | H04B 7/065 370/329 |
| 2015/0117352 | A1* | 4/2015 | Nammi | H04L 5/0058 370/329 |
| 2016/0112892 | A1 | 4/2016 | Damnjanovic et al. | |
| 2018/0234998 | A1* | 8/2018 | You | H04W 72/042 |
| 2018/0270794 | A1* | 9/2018 | Tiirola | H04L 5/0051 |
| 2018/0375619 | A1* | 12/2018 | Hwang | H04W 72/0446 |
| 2019/0116583 | A1* | 4/2019 | Sahlin | H04W 72/042 |

OTHER PUBLICATIONS

International Search Report and Written Opinion—PCT/US2017/060780—ISA/EPO—dated Feb. 2, 2018 (170846WO).

Nokia et al., "On 2-OS sPUSCH Structure and Details of UL DMRS in Shorter TTI", 3GPP Draft; R1-1612153, 3rd Generation Partnership Project (3gpp), Mobile Competence Centre, 650, Route Des Lucioles, F-06921 Sophia-Antipolis Cedex, France, vol. RAN WG1, No. Reno, Nevada, US; Nov. 4, 2016, XP051189192, Retrieved from the internet: URL:http://www.3gpp.org/ftp/tsg_ran/WG1_RL1/TSGR1_87/Docs/ [retrieved on Nov. 4, 2016], 5 pages.

Qualcomm Incorporated: "sTTI Operation", 3GPP Draft; R1-1611637, 3rd Generation Partnership Project (3GPP), Mobile Competence Centre, 650, Route Des Lucioles, F-06921 Sophia-Antipolis Cedex, France, vol. RAN WG1, No. Reno. Nevada, USA; Nov. 5, 2016, XP051190043, Retrieved from the Internet: URL:http://www.3gpp.org/ftp/tsg_ran/WG1_RL1/TSGR1_87/Docs/ [retrieved on Nov. 5, 2016],6 pages.

Huawei, et al., "Control Signaling Enhancements for Short TTI" 3GPP TSG RAN WG1 Meeting #83, R1-156461, Anaheim, USA, Nov. 15-22, 2015, 6 Pages, Nov. 22, 2015.

Taiwan Search Report—TW106138918—TIPO—dated Feb. 22, 2021 (170846TW).

Ericsson: "Design Aspects of sPUCCH", 3GPP TSG RAN WG1 #87, R1-1611517, Reno, USA, Nov. 14, 2016-Nov. 18, 2016, 7 Pages, Nov. 4, 2016, Internet URL: http://www.3gpp.org/ftp/tsg_ran/WG1_RL1/TSGR1_87/Docs/R1-1611517.zip.

Ericsson: "On UL sTTI layout", 3GPP TSG RAN WG1 #87, R1-1611508, Reno, USA, 8 Pages, Nov. 4, 2016, Internet URL: http://www.3gpp.org/ftp/tsg_ran/WG1_RL1/TSGR1_87/Docs/R1-1611508.zip.

Qualcomm Incorporated: "Uplink Data Channel Design for Shortened TTI", 3GPP TSG RAN WG1 #87 R1-1611641, Reno, USA, Nov. 14, 2016-Nov. 18, 2016, 6 Pages, Nov. 5, 2016, Internet URL: http://www.3gpp.org/ftp/tsg_ran/WG1_RL1/TSGR1_87/Docs/R1-1611641.zip.

* cited by examiner

CONFIGURATION FOR DATA AND REFERENCE SIGNAL TRANSMISSIONS WITH SHORTENED TRANSMISSION TIME INTERVALS

CROSS REFERENCES

The present application for patent claims priority to U.S. Provisional Patent Application No. 62/421,183 by Hosseini, et al., entitled "Configuration For Data and Reference Signal Transmissions With Shortened Transmission Time Intervals," filed Nov. 11, 2016, assigned to the assignee hereof.

BACKGROUND

The following relates generally to wireless communication, and more specifically to configuration for data and reference signal transmissions with shortened transmission time intervals (sTTIs).

Wireless multiple-access technologies have been adopted in various telecommunication standards to provide a common protocol that enables different wireless devices to communicate on a municipal, national, regional, and even global level. An example telecommunication standard is Long Term Evolution (LTE). LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology.

In some examples, a wireless multiple-access communication system may include a number of base stations, each simultaneously supporting communication for multiple communication devices, otherwise known as user equipment (UEs). In a LTE or LTE-Advanced (LTE-A) network, a set of one or more base stations may define an eNodeB (eNB). In other examples (e.g., in a next generation new radio (NR) or 5G network), a wireless multiple access communication system may include a number of smart radio heads (RHs) in communication with a number of access node controllers (ANCs), where a set of one or more RHs, in communication with an ANC, defines a base station (e.g., an eNB or gNB). A base station may communicate with a set of UEs on downlink (DL) channels (e.g., for transmissions from a base station to a UE) and uplink (UL) channels (e.g., for transmissions from a UE to a base station).

A base station in some LTE or NR deployments may transmit to one or more UEs using a transmission time interval (TTI) that is reduced in length relative to legacy LTE TTIs. Such a TTI may be referred to as a shortened TTI (sTTI) and users communicating using sTTIs may be referred to as low latency users. An sTTI may be a subset of one or more subframes that correspond to legacy TTI subframes. A base station may allocate transmission resources for sTTIs to a UE that may include time and/or frequency resources. Efficient allocation of such resources for data, control information, and reference signal transmissions may help to increase the efficiency of a wireless communications system.

SUMMARY

The described techniques relate to improved methods, systems, devices, or apparatuses that support configurations for data and reference signal (RS) transmissions in shortened transmission time intervals (sTTIs) having three orthogonal division multiplexing (OFDM) symbols. Generally, the described techniques provide for identifying uplink resources that are to be used for uplink transmissions using sTTIs (e.g., low latency or high reliability transmissions). A RS configuration, including locations of one or more RS symbols and one or more data symbols within the sTTI may be identified. The RS configuration, along with the allocation of uplink resources, may be provided to a user equipment (UE) which may transmit uplink communications using the allocated uplink resources. In some examples, the RS configuration, such as a demodulation reference signal (DMRS) configuration, may be identified dynamically by a base station and signaled to the UE. Reference signals from two or more UEs may, in some cases, be multiplexed (e.g., by applying different cyclic shifts at each UE or through assigning different UEs different RS symbols of a sTTI) and transmitted using reference signal resources for a sTTI.

A method of wireless communication is described. The method may include allocating uplink resources for an uplink control channel transmission in a first TTI comprising three OFDM symbols within a slot of a subframe, identifying a RS configuration for the first TTI, and transmitting an uplink grant for the uplink control channel transmission to a UE, the uplink grant including an indication of at least one of the allocated uplink resources for the first TTI and the RS configuration.

An apparatus for wireless communication is described. The apparatus may include means for allocating uplink resources for an uplink control channel transmission in a first TTI comprising three OFDM symbols within a slot of a subframe, means for identifying a RS configuration for the first TTI, and means for transmitting an uplink grant for the uplink control channel transmission to a UE, the uplink grant including an indication of at least one of the allocated uplink resources for the first TTI and the RS configuration.

Another apparatus for wireless communication is described. The apparatus may include a processor, memory in electronic communication with the processor, and instructions stored in the memory. The instructions may be operable to cause the processor to allocate uplink resources for an uplink control channel transmission in a first TTI comprising three OFDM symbols within a slot of a subframe, identify a RS configuration for the first TTI, and transmit an uplink grant for the uplink control channel transmission to a UE, the uplink grant including an indication of at least one of the allocated uplink resources for the first TTI and the RS configuration.

A non-transitory computer readable medium for wireless communication is described. The non-transitory computer-readable medium may include instructions operable to cause a processor to allocate uplink resources for an uplink control channel transmission in a first TTI comprising three OFDM symbols within a slot of a subframe, identify a RS configuration for the first TTI, and transmit an uplink grant for the uplink control channel transmission to a UE, the uplink grant including an indication of at least one of the allocated uplink resources for the first TTI and the RS configuration.

In some examples of the method, apparatus, and non-transitory computer-readable medium described above, the RS configuration indicates one or more OFDM symbol locations within the first TTI that may be to be used for a data transmissions and one or more OFDM symbol locations within the first TTI that may be to be used for a DMRS transmission.

In some examples of the method, apparatus, and non-transitory computer-readable medium described above, the identifying the RS configuration comprises identifying one data symbol, one RS symbol and one unused symbol within the first TTI. Some examples of the method, apparatus, and non-transitory computer-readable medium described above may further include processes, features, means, or instructions for determining whether the first TTI may be located at a beginning of the subframe or located at an end of the subframe, and selecting an initial symbol of the first TTI as the unused symbol responsive to determining that the first TTI may be located at the beginning of the subframe, selecting a last symbol of the first TTI as the unused symbol responsive to determining that the first TTI may be located at the end of the subframe, or selecting either the initial symbol or the last symbol of the first TTI as the unused symbol responsive to determining that the first TTI may be not located at the beginning or the end of the subframe. Some examples of the method, apparatus, and non-transitory computer-readable medium described above may further include processes, features, means, or instructions for determining that the first TTI is located at a beginning of the subframe, and selecting either the initial symbol or the last symbol of the first TTI as the unused symbol based at least in part on whether the data symbol or the RS symbol is to be protected.

In some examples of the method, apparatus, and non-transitory computer-readable medium described above, the identifying the RS configuration comprises identifying two data symbols and one RS symbol. In some examples of the method, apparatus, and non-transitory computer-readable medium described above, the two data symbols may be configured to carry redundant information. In some examples of the method, apparatus, and non-transitory computer-readable medium described above, the two data symbols include a first data symbol configured to transmit control data using a first cyclically shifted sequence and a second data symbol configured to transmit the same control data using a second cyclically shifted sequence. In some examples of the method, apparatus, and non-transitory computer-readable medium described above, the two data symbols include a first data symbol configured to transmit control data using a first scrambling sequence and a second data symbol configured to transmit the same control data using a second scrambling sequence. In some examples of the method, apparatus, and non-transitory computer-readable medium described above, the two data symbols may be self-decodable.

In some examples of the method, apparatus, and non-transitory computer-readable medium described above, the two data symbols may be configured to carry non-redundant information. Some examples of the method, apparatus, and non-transitory computer-readable medium described above may further include processes, features, means, or instructions for configuring the first TTI with a first number of bundling operations, and configuring a second TTI comprising two OFDM symbols within the slot of the subframe with a second number of bundling operations that may be larger than the first number of bundling operations.

Some examples of the method, apparatus, and non-transitory computer-readable medium described above may further include processes, features, means, or instructions for configuring the first TTI with a first number of feedback acknowledgment bits, and configuring the second TTI with a second number of feedback acknowledgment bits that may be smaller than the first number of feedback acknowledgment bits. Some examples of the method, apparatus, and non-transitory computer-readable medium described above may further include processes, features, means, or instructions for configuring the first TTI with a rich CSI process, and configuring the second TTI with a constrained CSI process.

In some examples of the method, apparatus, and non-transitory computer-readable medium described above, the RS configuration may be transmitted to a UE through RRC signaling or in an uplink grant.

In some examples of the method, apparatus, and non-transitory computer-readable medium described above, the identifying the reference signal configuration comprises identifying a higher density RS configuration for the first TTI relative to a lower density RS configuration of a second TTI within the slot of the subframe that may have two OFDM symbols. In some examples of the method, apparatus, and non-transitory computer-readable medium described above, the identifying the reference signal configuration comprises configuring a first OFDM symbol of the first TTI for a RS transmission of the UE and configuring a second OFDM symbol of the first TTI for a RS transmission of a second UE, or configuring a first interlace of each of the first OFDM symbol and the second OFDM symbol of the first TTI for a RS transmission of the UE and configuring a second interlace of each of the first OFDM symbol and the second ODFM symbol of the first TTI for a RS transmission of a second UE.

A method of wireless communication is described. The method may include receiving an allocation of uplink resources from a base station for a first TTI, the first TTI comprising three OFDM symbols within a slot of a radio subframe, identifying a RS and data configuration for the first TTI, and transmitting a RS and data to the base station using the allocated uplink resources based at least in part on the RS and data configuration.

An apparatus for wireless communication is described. The apparatus may include means for receiving an allocation of uplink resources from a base station for a first TTI, the first TTI comprising three OFDM symbols within a slot of a radio subframe, means for identifying a RS and data configuration for the first TTI, and means for transmitting a RS and data to the base station using the allocated uplink resources based at least in part on the RS and data configuration.

Another apparatus for wireless communication is described. The apparatus may include a processor, memory in electronic communication with the processor, and instructions stored in the memory. The instructions may be operable to cause the processor to receive an allocation of uplink resources from a base station for a first TTI, the first TTI comprising three OFDM symbols within a slot of a radio subframe, identify a RS and data configuration for the first TTI, and transmit a RS and data to the base station using the allocated uplink resources based at least in part on the RS and data configuration.

A non-transitory computer readable medium for wireless communication is described. The non-transitory computer-readable medium may include instructions operable to cause a processor to receive an allocation of uplink resources from a base station for a first TTI, the first TTI comprising three OFDM symbols within a slot of a radio subframe, identify a RS and data configuration for the first TTI, and transmit a RS and data to the base station using the allocated uplink resources based at least in part on the RS and data configuration.

In some examples of the method, apparatus, and non-transitory computer-readable medium described above, the RS configuration indicates one or more OFDM symbol locations within the first TTI that may be to be used for a data transmissions and one or more OFDM symbol locations within the first TTI that may be to be used for a DMRS transmission.

In some examples of the method, apparatus, and non-transitory computer-readable medium described above, the identifying the RS configuration comprises identifying one data symbol, one RS symbol and one unused symbol within the first TTI. In some examples of the method, apparatus, and non-transitory computer-readable medium described above, an initial symbol of the first TTI may be the unused symbol when the first TTI may be located at the beginning of the subframe, a last symbol of the first TTI may be the unused symbol when the first TTI may be located at an end of the subframe, or either the initial symbol or the last symbol of the first TTI may be the unused symbol when the first TTI may be not located at the beginning or the end of the subframe. In some examples of the method, apparatus, and non-transitory computer-readable medium described above, either the initial symbol or the last symbol of the first TTI is the unused symbol when the first TTI is located at the beginning of the subframe.

In some examples of the method, apparatus, and non-transitory computer-readable medium described above, the identifying the RS configuration comprises identifying two data symbols and one RS symbol. In some examples of the method, apparatus, and non-transitory computer-readable medium described above, the two data symbols may be configured to carry redundant information. In some examples of the method, apparatus, and non-transitory computer-readable medium described above, the two data symbols include a first data symbol with control data that may be cyclically shifted using a first cyclical shift (CS) and a second data symbol with the same control data that may be cyclically shifted using a second CS that may be different than the first CS. In some examples of the method, apparatus, and non-transitory computer-readable medium described above, the two data symbols include a first data symbol with control data that may be scrambled using a first scrambling sequence and a second data symbol with the same control data that may be scrambled using a second scrambling sequence. In some examples of the method, apparatus, and non-transitory computer-readable medium described above, the two data symbols may be self-decodable.

In some examples of the method, apparatus, and non-transitory computer-readable medium described above, the two data symbols may be configured to carry non-redundant information. Some examples of the method, apparatus, and non-transitory computer-readable medium described above may further include processes, features, means, or instructions for transmitting the first TTI using a first number of bundling operations, and transmitting a second TTI comprising two OFDM symbols within the slot of the subframe using a second number of bundling operations that may be larger than the first number of bundling operations. Some examples of the method, apparatus, and non-transitory computer-readable medium described above may further include processes, features, means, or instructions for transmitting the first TTI with a first number of feedback acknowledgment bits, and transmitting the second TTI with a second number of feedback acknowledgment bits that may be smaller than the first number of feedback acknowledgment bits. Some examples of the method, apparatus, and non-transitory computer-readable medium described above may further include processes, features, means, or instructions for transmitting the first TTI with a rich CSI process, and transmitting the second TTI with a constrained CSI process.

Some examples of the method, apparatus, and non-transitory computer-readable medium described above may further include processes, features, means, or instructions for receiving RRC signaling including the RS configuration. In some examples of the method, apparatus, and non-transitory computer-readable medium described above, the receiving further comprises receiving the RS configuration as part of the allocation of uplink resources. In some examples of the method, apparatus, and non-transitory computer-readable medium described above, the RS for the first TTI may be a higher density RS than a lower density RS of a second TTI within the slot of the subframe that may have two OFDM symbols.

DETAILED DESCRIPTION

Figure 1:
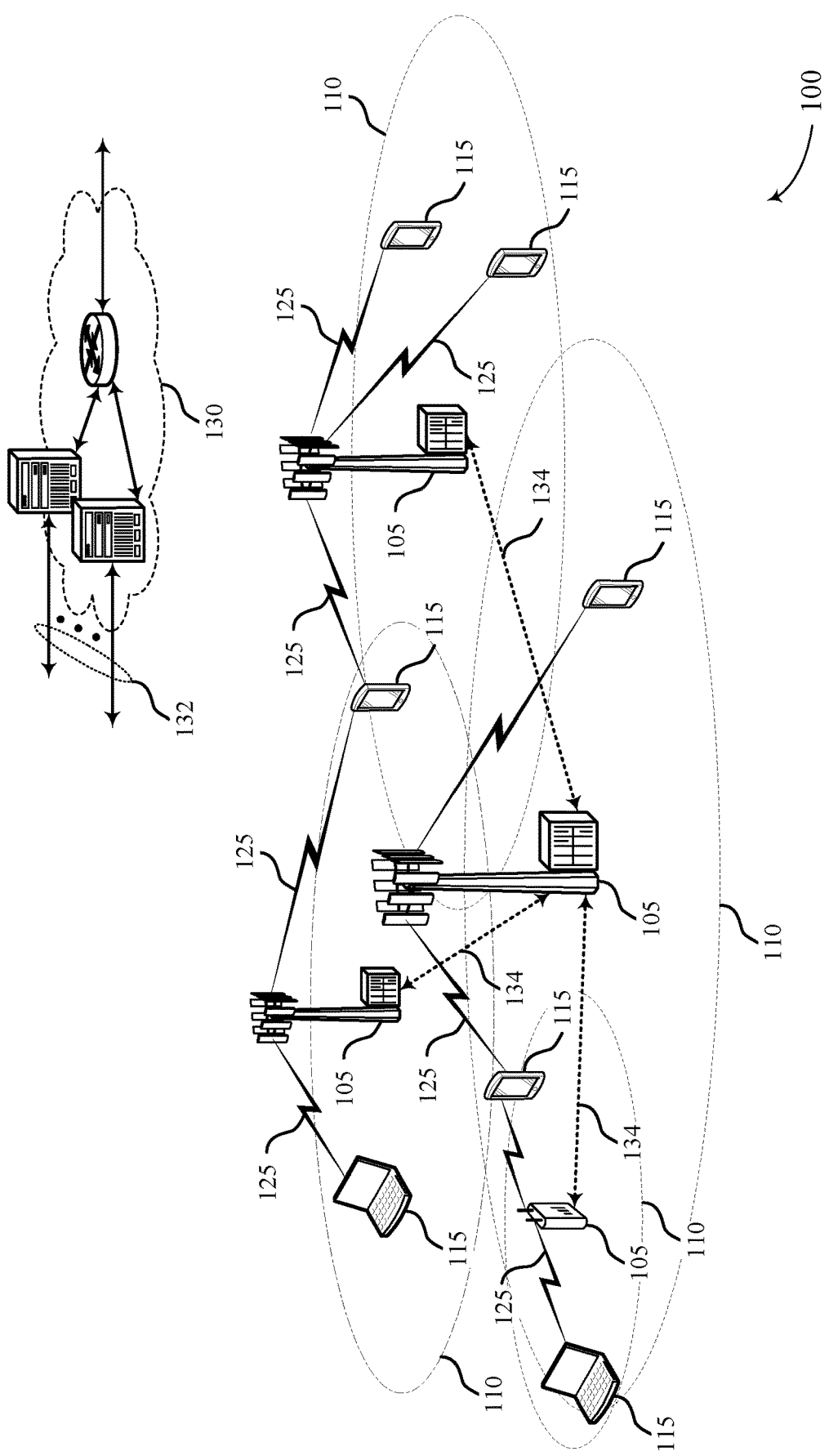
FIG. 1 illustrates an example of a system for wireless communication that supports configuration for data and reference signal transmissions with sTTIs in accordance with aspects of the present disclosure.

Improved methods, systems, devices, or apparatuses of various examples may be used to support configuration for data and reference signal transmissions with sTTIs in low latency wireless communications systems. Resources allocated for low latency communication may be used for uplink and downlink communication using sTTIs that have a reduced length relative to TTIs of communications that may be relatively latency insensitive, such as enhanced mobile broadband (eMBB) transmissions that may use a 1 ms TTI duration. Communications using sTTIs may use, in some cases, a sTTI duration that corresponds to one slot of a wireless subframe, or a sTTI duration that corresponds to two or three orthogonal frequency division multiplexing (OFDM) symbols, for example. In some cases, sTTIs may be configured to have boundaries within or aligned with boundaries of a slot of a 1 ms TTI, which may be referred to as slot-aligned sTTIs. In some examples, the sTTIs may span two or three OFDM symbols, and each slot may have two two-symbol TTIs and one three-symbol TTI. In such a manner, all seven symbols of a slot using a normal cyclic prefix may be utilized and system resources may be more efficiently utilized relative to a case where three two-symbol sTTIs would be included in a seven-symbol slot.

Various techniques as disclosed herein may provide configurations for data and RS transmissions in sTTIs having three OFDM symbols. In some cases, uplink resources may be identified for uplink transmissions that are to be made using sTTIs (e.g., low latency or high reliability transmissions). A RS configuration, including locations of one or more RS symbols and one or more data symbols within the sTTI may be identified. The RS configuration, along with the allocation of uplink resources, may be provided to a UE that may transmit uplink communications using the allocated uplink resources.

In some cases, the RS configuration provides a three-symbol sTTI with one data symbol, one RS symbol, and one unused or null symbol. In some examples, the unused symbol may be located at a beginning of a subframe when the sTTI is located at the beginning of the subframe, which may provide for more relaxed processing timelines or RF component switching timelines at the beginning of the subframe, which may be beneficial for certain types of UE, such as machine type communications (MTC) type UEs for example. In some examples, the unused symbol may be located at an end of the subframe, which may be beneficial in cases where a sounding reference signal (SRS) is to be transmitted using the last symbol of a subframe. In cases, where the sTTI does not include an initial or end symbol of a subframe, the unused symbol could be located in any symbol of the sTTI.

In some cases, the RS configuration provides a three-symbol sTTI with two data symbols and one RS symbol. In some examples, the two data symbols may be used to enhance coverage for the sTTI. In some examples, redundant data may be sent in each of the two data symbols, which may be combined at a receiving base station to enhance the likelihood of successful reception decoding of the sTTI. In some cases, the different data symbols of the sTTI may use different cyclic shifts, which may help mitigate interference. Additionally or alternatively, different data symbols of the sTTI may use different scrambling sequences, which also may help mitigate interference. In some cases, each data symbol of the sTTI may be self-decodable.

In some cases, the RS configuration provides a three-symbol sTTI with two data symbols and one RS symbol, and the two data symbols may be used to enhance data capacity for the sTTI. In some examples, non-redundant data may be sent in each of the two data symbols. In some cases, a number of bundling operations for the sTTI may be reduced relative to a number of bundling operations that may be used for a two-symbol sTTI. In some cases, a number of feedback bits (e.g., HARQ ACK/NACK bits) for a three-symbol sTTI may be increased relative to a number of feedback bits for a two-symbol sTTI. In some examples, a three-symbol sTTI may be used to transmit a rich CSI, and a two-symbol sTTI may be configured to transmit a constrained CSI.

In some examples, the RS configuration, such as a DMRS configuration, may be identified dynamically by a base station and signaled to the UE. Reference signals from two or more UEs may, in some cases, be multiplexed (e.g., by applying different cyclic shifts at each UE or through assigning different UEs different RS symbols of a sTTI) and transmitted using reference signal resources for a sTTI. The RS configuration techniques may be used for shortened physical uplink control channel (sPUCCH) transmissions. In some cases, RS configuration techniques may be used for shortened physical uplink shared channel (sPUSCH) transmissions that may carry uplink control information (UCI).

In some cases, a reference signal density for a three-symbol sTTI may be higher than a reference signal density of a two-symbol sTTI. In some cases, the three-symbol sTTI may be configured with two RS symbols and one data symbol. One UE may be configure to transmit a RS on a first RS symbol, and a second UE may be configured to transmit a RS on a second RS symbol. In some examples two UEs may together use both RS symbols and transmit RSs using different cyclic shifts. In other examples, each RS symbol may be configured with multiple interlaces, and different UEs may transmit a RS on one or more of the configured interlaces.

Such low latency communications may be used in a system, for example, that may support multiple different services for data communications that may be selected depending upon the nature of the communications. For example, communications that require low latency and high reliability, sometimes referred to as mission critical (MiCr) communications, may be served through a lower-latency service (e.g., an ultra-reliable low-latency communication (URLLC) service) that uses sTTIs. Correspondingly, communications that are more delay-tolerant may be served through a service that provides relatively higher throughput with somewhat higher latency, such as a mobile broadband service (e.g., an enhanced mobile broadband (eMBB) service) that uses 1 ms TTIs. In other examples, communications may be with UEs that are incorporated into other devices (e.g., meters, vehicles, appliances, machinery, etc.), and a machine-type communication (MTC) service (e.g., massive MTC (mMTC)) may be used for such communications. In some cases, different services (e.g., eMBB, URLLC, mMTC) may have different TTIs, different subcarrier (or tone) spacing and different cyclic prefixes.

The present disclosure describes various techniques with reference to next generation networks (e.g., 5G or NR networks) that are being designed to support features such as high bandwidth operations, more dynamic subframe/slot types, and self-contained subframe/slot types (in which HARQ feedback for a subframe/slot may be transmitted before the end of the subframe/slot). However, such techniques may be used for any system in which TTIs of different lengths may be transmitted in a wireless communications system.

Aspects of the disclosure are initially described in the context of a wireless communications system. Aspects of the disclosure are further illustrated by and described with reference to apparatus diagrams, system diagrams, and flowcharts that relate to configuration for data and reference signal transmissions with sTTIs.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced) network, or a New Radio (NR) network. In some cases, wireless communications system 100 may support enhanced broadband communications, ultra-reliable (e.g., mission critical) communications, low latency communications, and communications with low-cost and low-complexity devices. Wireless communications system 100 may provide for configuration of reference signal transmissions, such as demodulation reference signal (DMRS) transmissions, when using sTTIs.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, a drone, or the like.

In some cases, a UE 115 may also be able to communicate directly with other UEs (e.g., using a peer-to-peer (P2P) or device-to-device (D2D) protocol). Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable and low latency communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may be an example of a LTE eNB, an eLTE eNB, an NR gNB, an NR Node-B, an NR access node, and may include an access node controller (ANC).

A base station 105 may interface with the core network 130 through backhaul links 132 (e.g., S1, S2, NG-1, NG-2, NG-3, NG-C, NG-U etc.) and may perform radio configuration and scheduling for communication with the UEs 115 within an associated coverage area 110. In various examples, the network devices 105-b may communicate, either directly or indirectly (e.g., through core network 130), with each other over backhaul links 134 (e.g., X1, X2, Xn etc.), which may be wired or wireless communication links. Each base station 105 may also communicate with a number of UEs 115 through a number of other network devices, where a network device may be an example of a transmission reception point (TRP), a distributed unit (DU), a radio head (RH), a remote radio head (RRH), or a smart radio head.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, and shorter transmission time interval (TTIs). In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable. A 5G or NR carrier may be considered an eCC.

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Time intervals in LTE or NR may be expressed in multiples of a basic time unit (which may be a sampling period of $T_s=1/30,720,000$ seconds). Time resources in LTE/LTE-A may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in sTTI bursts or in selected component carriers using sTTIs). Various examples discussed herein provide techniques for shortened TTIs, which may provide reference signal configuration for sTTIs that may be used to provide efficient and reliable RS and data transmissions for uplink communications from a UE 115.

Figure 2:
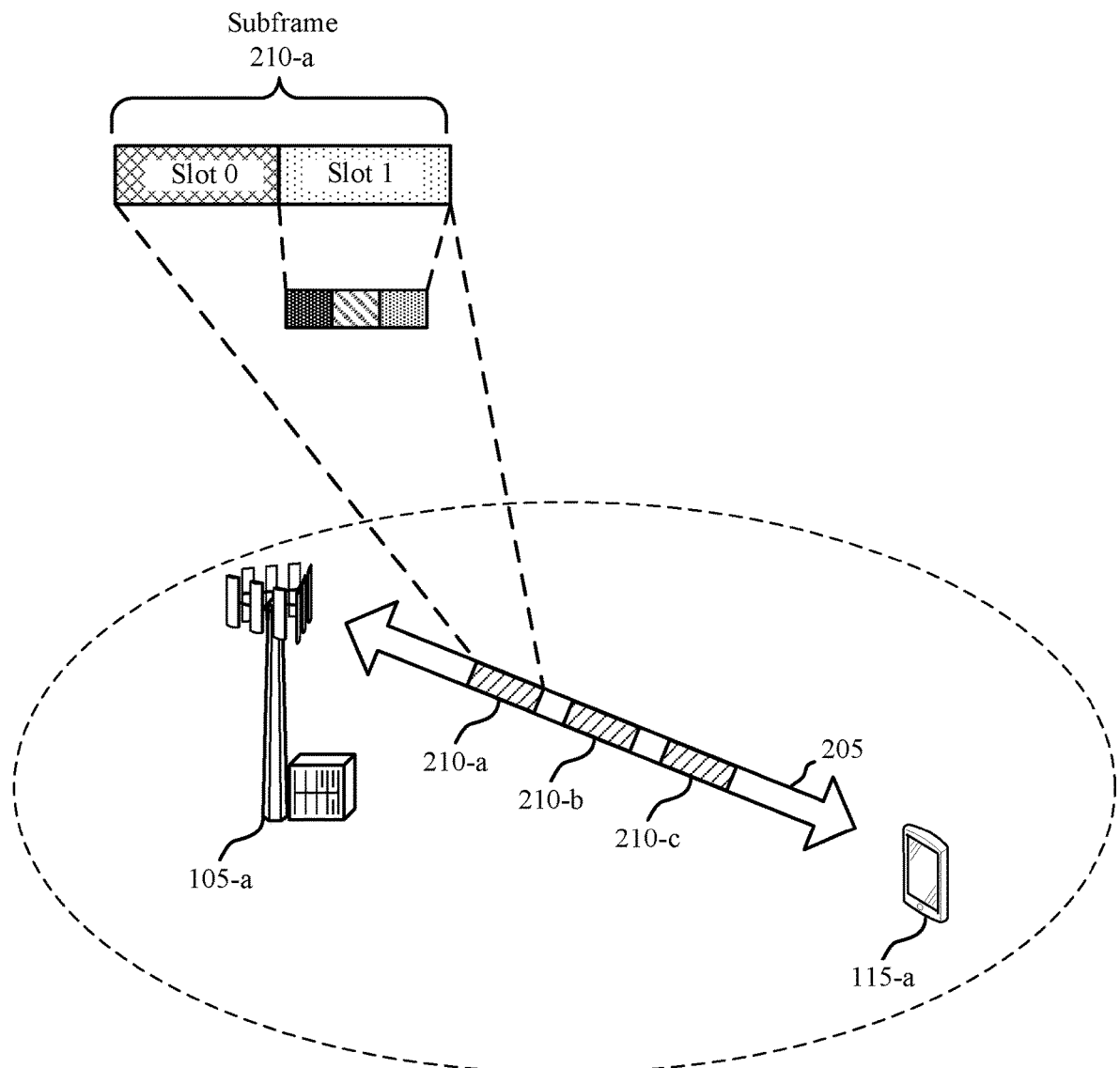
FIG. 2 illustrates an example of a wireless communications system that supports configuration for data and reference signal transmissions with sTTIs in accordance with aspects of the present disclosure.
Figure 2:

FIG. 2 illustrates an example of a wireless communications system 200 for configuration for data and reference signal transmissions with sTTIs. Wireless communications system 200 includes base station 105-a and UE 115-a, which may be examples of aspects of a UE 115 as described above with reference to FIG. 1. In the example of FIG. 2, the wireless communications system 200 may operate according to a radio access technology (RAT) such as a 5G or NR RAT, although techniques described herein may be applied to any RAT and to systems that may concurrently use two or more different RATs.

Base station 105-a may communicate with UE 115-a over carrier 205. In some examples, base station 105-a may allocate resources for communication with UEs over carrier 205. For example, base station 105-a may allocate subframes 210 for communication with UE 115-a, and one or more subframes 210 may correspond to a legacy LTE TTI of 1 ms. In this example, subframes 210 may include a first subframe 210-a, a second subframe 210-b, and a third subframe 210-c. Each of the subframes 210 may include two slots, in which each slot may have seven symbols for a normal cyclic prefix. In this example, a first slot (slot 0) 220 and a second slot (slot 1) 225 may be included in the first subframe 210-a.

As indicated above, in the uplink of a low latency system, different sTTI lengths may be used for transmissions over carrier 205. For example, two-symbol sTTI and 1-slot sTTI durations may be supported for physical uplink control channel (PUCCH) and physical uplink shared channel (PUSCH) transmissions (or shortened PUCCH (sPUCCH) and shortened PUSCH (sPUSCH) transmissions). Thus, within first slot 220 or second slot 225, there may be multiple sTTIs, such as a first sTTI (TTI-0) 230, a second sTTI (TTI-1) 235, and a third sTTI (TTI-2) 240, that may each have a two or three OFDM symbol duration. While various examples discussed herein are described with respect to uplink communications, such techniques may also apply to downlink communications in some examples. When two-symbol sTTI is used, in some cases it may be desirable to have a fixed sTTI structure in which sTTI boundaries lie within slot boundaries or are aligned with slot boundaries, such as the boundaries of the first slot 220 or second slot 225, which may be referred to as slot-aligned sTTIs. As discussed above, when using a normal CP, seven symbols are included in each slot 220-225, and thus each slot may include three sTTIs for slot-aligned sTTIs. In some cases, one of the sTTIs may be configured as a three-symbol TTI, so as to efficiently utilize each symbol of each slot. In such cases, different patterns can be considered, such as having the three-symbol TTI located at the end of a slot 220-225, or at the beginning of a slot 220-225.

Various aspects of the present disclosure provide configurations for RS and data transmissions for sTTIs. In some examples, the RS configurations may be dynamically configured to provide efficient data transmissions with sufficient RS transmissions. In some cases, a three-symbol sTTI may be configured with one data symbol, one RS symbol, and one unused symbol. In other cases, a three-symbol sTTI may be configured with two data symbols and one RS symbol, which may be used to enhance coverage and/or capacity of the sTTI. In further cases, a three-symbol sTTI may be configured with one data symbol and one RS symbol, which may be used to enhance RS density of the sTTI.

Figure 3:
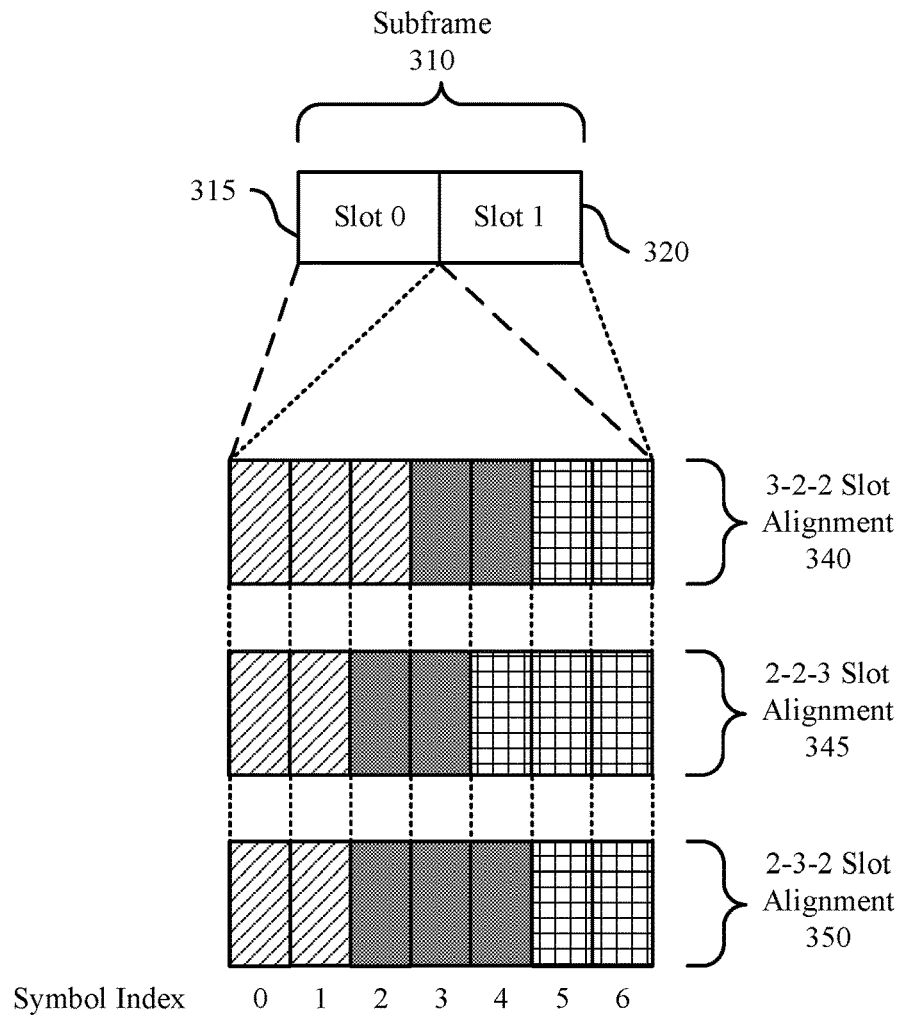
FIG. 3 illustrates an example of sTTI patterns for slot-aligned sTTIs that support configuration for data and reference signal transmissions with sTTIs in accordance with aspects of the present disclosure.

FIG. 3 illustrates an example of slot-aligned sTTI patterns 300 that may be configured for data and reference signal transmissions with sTTIs. Slot-aligned sTTI patterns 300 may be used for low latency communications between a UE and a base station such as discussed above with respect to FIGS. 1 and 2. A subframe 310 may have resources allocated for uplink communication. Subframe 310 may include two slots: first slot (slot 0) 315 and second slot (slot 1) 320 that may correspond to legacy LTE slots. Each slot 315 and 320 may include slot-aligned sTTIs allocated for low latency communication. Each slot 315 and 320 may include three sTTIs, including a first TTI (TTI-0) 325, a second TTI (TTI-1) and a third TTI (TTI-2) 335. In some examples, the TTIs 325 through 335 may be aligned in a 3-2-2 slot alignment 340, in which the first TTI 325 may include three symbols, the second TTI 330 may include two symbols, and the third TTI 335 may include two symbols.

In other examples, the TTIs 325 through 335 may be aligned in a 2-2-3 slot alignment 345, in which the first TTI 325 may include two symbols, the second TTI 330 may include two symbols, and the third TTI 335 may include three symbols. In other examples, the TTIs 325 through 335 may be aligned in a 2-3-2 slot alignment 350, in which the first TTI 325 may include two symbols, the second TTI 330 may include three symbols, and the third TTI 335 may include two symbols. Of course, other alignment patterns may be used for communications, and the illustrated slot alignment 340 through 350 are provided for purposes of illustration and discussion. Additionally, the first slot 315 may use a different slot alignment than the second slot 320. For example, each of the first slot 315 and the second slot 320 may use the 3-2-2 slot alignment 340 or may use the 2-2-3 slot alignment 345. Alternatively, the first slot 315 may use a 3-2-2 slot alignment 340 and the second slot may use the 2-2-3 slot alignment 345. Other combinations may be used as well, including combinations with different slot alignments.

As can be seen from above, in order to make sure that the sTTIs do not cross the slot boundary within t3he 1 ms subframe, both 2-symbol and 3-symbol sTTIs may be used within a slot. In various examples, positioning of RS symbols and data symbols may be configured to provide efficient communications. The RS configurations may be dynamically configured to provide efficient data transmissions with sufficient RS transmissions. In some cases, a three-symbol sTTI may be configured with one data symbol, one RS symbol, and one unused symbol. In other cases, a three-symbol sTTI may be configured with two data symbols and one RS symbol, which may be used to enhance coverage and/or capacity of the sTTI. In further cases, a three-symbol sTTI may be configured with one data symbol and one RS symbol, which may be used to enhance RS density of the sTTI.

Figure 4:
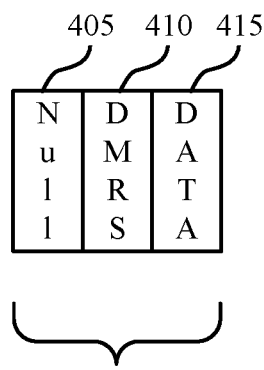
FIG. 4 illustrates an example of three-symbol sTTI data and DMRS patterns that support configuration for data and reference signal transmissions with sTTIs in accordance with aspects of the present disclosure.
Figure 4:
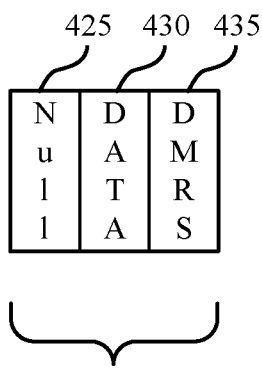
Figure 4:
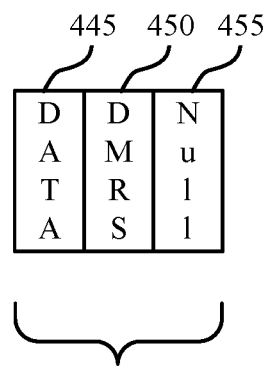
Figure 4:
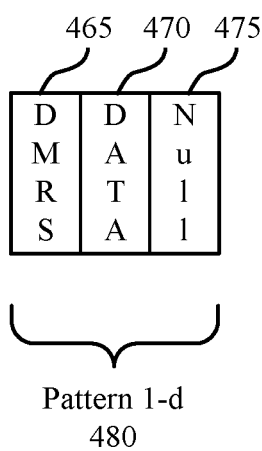

FIG. 4 illustrates an example of RS patterns 400 for configuration for data and reference signal transmissions with sTTIs. RS patterns 400 may be used as RS configurations in uplink transmissions between UEs 115 and base stations 105 such as discussed above with reference to FIGS. 1-2.

As indicated above, in some examples a three-symbol sTTI may be configured with one data symbol, one RS symbol, and one unused or null symbol. In one example of FIG. 4, a three-symbol sTTI may include a first symbol 405 configured to be an unused or null symbol, a second symbol 410 configured for a RS transmission, such as a DMRS transmission, and a third symbol 415 configured for data transmissions, as illustrated as pattern 1-*a* 420. In another example, a three-symbol sTTI may include a first symbol 425 configured to be an unused or null symbol, a second symbol 430 configured for data transmissions, and a third symbol 435 configured for RS transmissions, illustrated as pattern 1-*b* 440. In a third example, a three-symbol sTTI may include a first symbol 445 configured for data transmissions, a second symbol 450 configured for RS transmissions, and a third symbol 455 configured to be an unused or null symbol, illustrated as pattern 1-*c* 460. In a fourth example, a three-symbol sTTI may include a first symbol 465 configured for DMRS transmissions, a second symbol 470 configured for data transmissions and a third symbol 475 configured to be an unused or null symbol, illustrated as pattern 1-*d* 480. Other patterns may also be used, and RS patterns 400 are provided for purposes of illustration and discussion with the understanding that other patterns may be desirable is some cases.

In some examples, the unused symbol may be located at a beginning of a subframe, such as illustrated in pattern 1-*a* 420 or pattern 1-*b* 440, when the sTTI is located at the beginning of the subframe, which may provide for more relaxed processing timelines or RF component switching timelines at the beginning of the subframe. In some examples, the unused symbol may be located at an end of the subframe, such as illustrated in pattern 1-*c* 460 or pattern 1-*d* 480, which may be beneficial in cases where a SRS is to be transmitted using the last symbol of a subframe. In cases, where the sTTI does not include an initial or end symbol of a subframe, the unused symbol could be located in any symbol of the sTTI. In some examples, in transitioning from one subframe to a subsequent subframe, the allocated bandwidth may change which may result in a transient period between the subframes that may impact demodulation. For example, in an instance where there is a transient period between two subframes, the last symbol of the first of the two subframes and the first symbol of the subsequent subframe may be impacted. In this instance, if the one data symbol and the one RS symbol of the three-symbol sTTI is to be protected, the unused symbol may be located at a beginning of a first TTI of the subsequent subframe, or at an end of a last TTI of the first subframe. If the one data symbol and the one RS symbol of the three-symbol sTTI is not to be protected, the unused symbol may be located at an end of a first TTI of the subsequent subframe, or at a beginning of a last TTI of the first subframe.

The configured pattern, as indicated above, may be selected based on one or more different factors, such as other a location of the sTTI within a 1 ms subframe.

Figure 5:
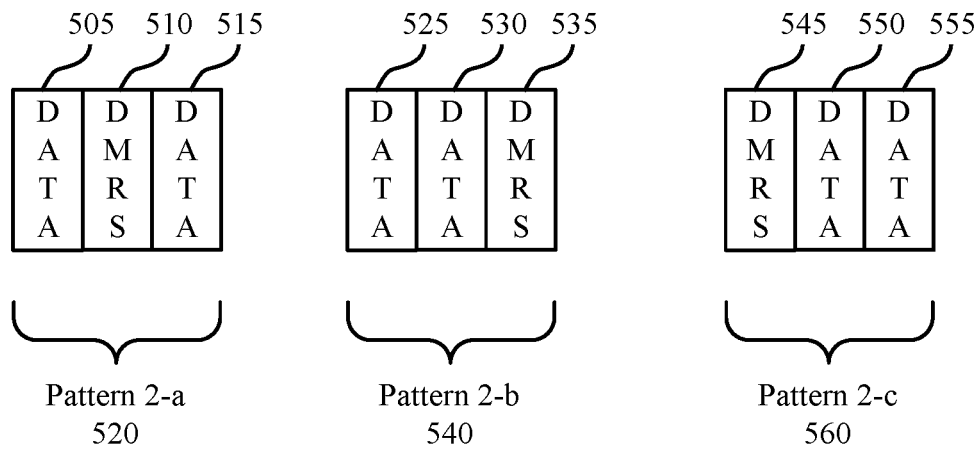
FIG. 5 illustrates another example of three-symbol sTTI data and DMRS patterns that support configuration for data and reference signal transmissions with sTTIs in accordance with aspects of the present disclosure.

FIG. 5 illustrates another example of RS patterns 500 for configuration for data and reference signal transmissions with sTTIs. RS patterns 500 may be used as RS configurations in uplink transmissions between UEs 115 and base stations 105 such as discussed above with reference to FIGS. 1-2.

As indicated above, in some examples a three-symbol sTTI may be configured with two data symbols and one RS symbol. In one example of FIG. 5, a three-symbol sTTI may include a first symbol 505 configured for data transmissions, a second symbol 510 configured for a RS transmission, such as a DMRS transmission, and a third symbol 515 configured for data transmissions, as illustrated as pattern 2-*a* 520. In another example, a three-symbol sTTI may include a first symbol 525 configured for data transmissions, a second symbol 530 configured for data transmissions, and a third symbol 535 configured for RS transmissions, illustrated as pattern 2-*b* 540. In a third example, a three-symbol sTTI may include a first symbol 545 configured for RS transmissions, a second symbol 550 configured for data transmissions and a third symbol 555 configured for data transmissions, illustrated as pattern 2-*c* 560.

The RS configurations illustrated in FIG. 5 may, in some examples, provide three-symbol sTTIs that may be used to enhance coverage or data capacity for the sTTI. In some examples, the two data symbols may be used to enhance coverage for the sTTI through transmission of redundant data in each of the two data symbols. The redundant data may be combined at a receiving base station to enhance the likelihood of successful reception decoding of the sTTI. In some cases, the different data symbols of the sTTI may use different cyclic shifts, which may help mitigate interference. Additionally or alternatively, different data symbols of the sTTI may use different scrambling sequences, which also may help mitigate interference. In some cases, each data symbol of the sTTI may be self-decodable.

In some examples, non-redundant data may be sent in each of the two data symbols to enhance capacity of the sTTI. In some cases, a number of hybrid automatic repeat request (HARQ) bundling operations for the sTTI may be reduced relative to a number of HARQ bundling operations that may be used for a two-symbol sTTI. In other examples, a three-symbol sTTI that provides enhanced capacity may have different feedback bits, such as HARQ ACK/NACK feedback bits. For example, a UE in MIMO mode may have a two-bit ACK using a three-symbol sTTI, but a one-bit (with spatial bundling of 2 HARQ bits) when a two-symbol sTTI is used. On other example, a UE using carrier aggregation for low-latency communications may have more HARQ bits in 3-symbol sTTIs, and less in 2-symbol sTTIs.

Additionally, in some cases UEs may perform CSI processes that provide a rich CSI in three-symbol sTTIs, and that provide a constrained CSI in two-symbol sTTIs.

Figure 6:
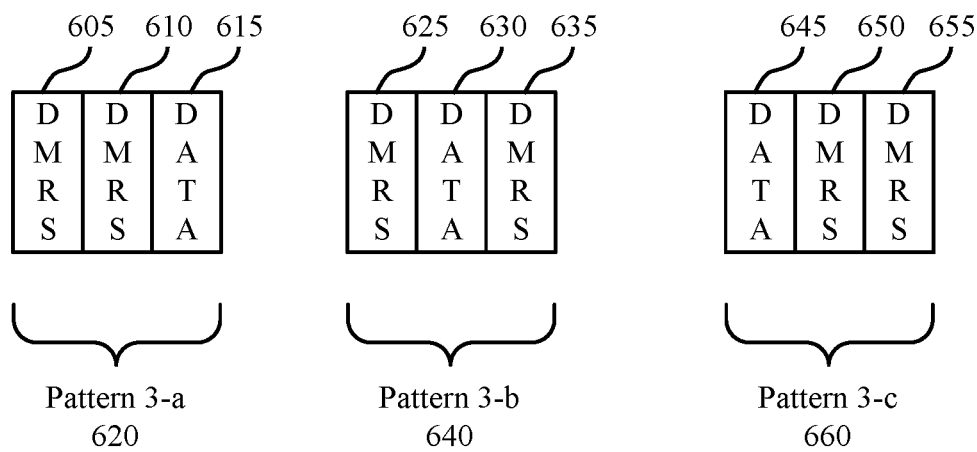
FIG. 6 illustrates another example of three-symbol sTTI data and DMRS patterns that support configuration for data and reference signal transmissions with sTTIs in accordance with aspects of the present disclosure.

FIG. 6 illustrates an example of RS patterns 600 for configuration for data and reference signal transmissions with sTTIs. RS patterns 600 may be used as RS configurations in uplink transmissions between UEs 115 and base stations 105 such as discussed above with reference to FIGS. 1-2.

As indicated above, in some examples a three-symbol sTTI may be configured with two RS symbols and one data symbol. In one example of FIG. 6, a three-symbol sTTI may include a first symbol 605 configured for RS transmissions, such as a DMRS transmission, a second symbol 610 configured for a RS transmission, and a third symbol 615 configured for data transmissions, as illustrated as pattern 3-a 620. In another example, a three-symbol sTTI may include a first symbol 625 configured for RS transmissions, a second symbol 630 configured for data transmissions, and a third symbol 635 configured for RS transmissions, illustrated as pattern 3-b 640. In a third example, a three-symbol sTTI may include a first symbol 645 configured for data transmissions, a second symbol 650 configured for RS transmissions and a third symbol 655 configured for data transmissions, illustrated as pattern 3-c 660.

The RS configurations illustrated in FIG. 6 may, in some examples, provide three-symbol sTTIs that may be used to enhance RS density for the sTTI. For example, a first UE may be configured to transmit a RS on a first RS symbol, and a second UE may be configured to transmit a RS on a second RS symbol. Each UE may use the entire symbol for the RS transmission, which may provide enhanced channel estimation. In other examples, each RS symbol may be configured with multiple interlaces, and different UEs may transmit a RS on one or more of the configured interlaces. In some examples two UEs may together use both RS symbols and transmit RSs using different cyclic shifts.

In some examples, the RS configuration, such as a DMRS configuration, may be identified dynamically by a base station and signaled to the UE. The RS configuration techniques may be used for shortened physical uplink control channel (sPUCCH) transmissions. In some cases, RS configuration techniques may be used for shortened physical uplink shared channel (sPUSCH) transmissions that may carry uplink control information (UCI).

Figure 7:
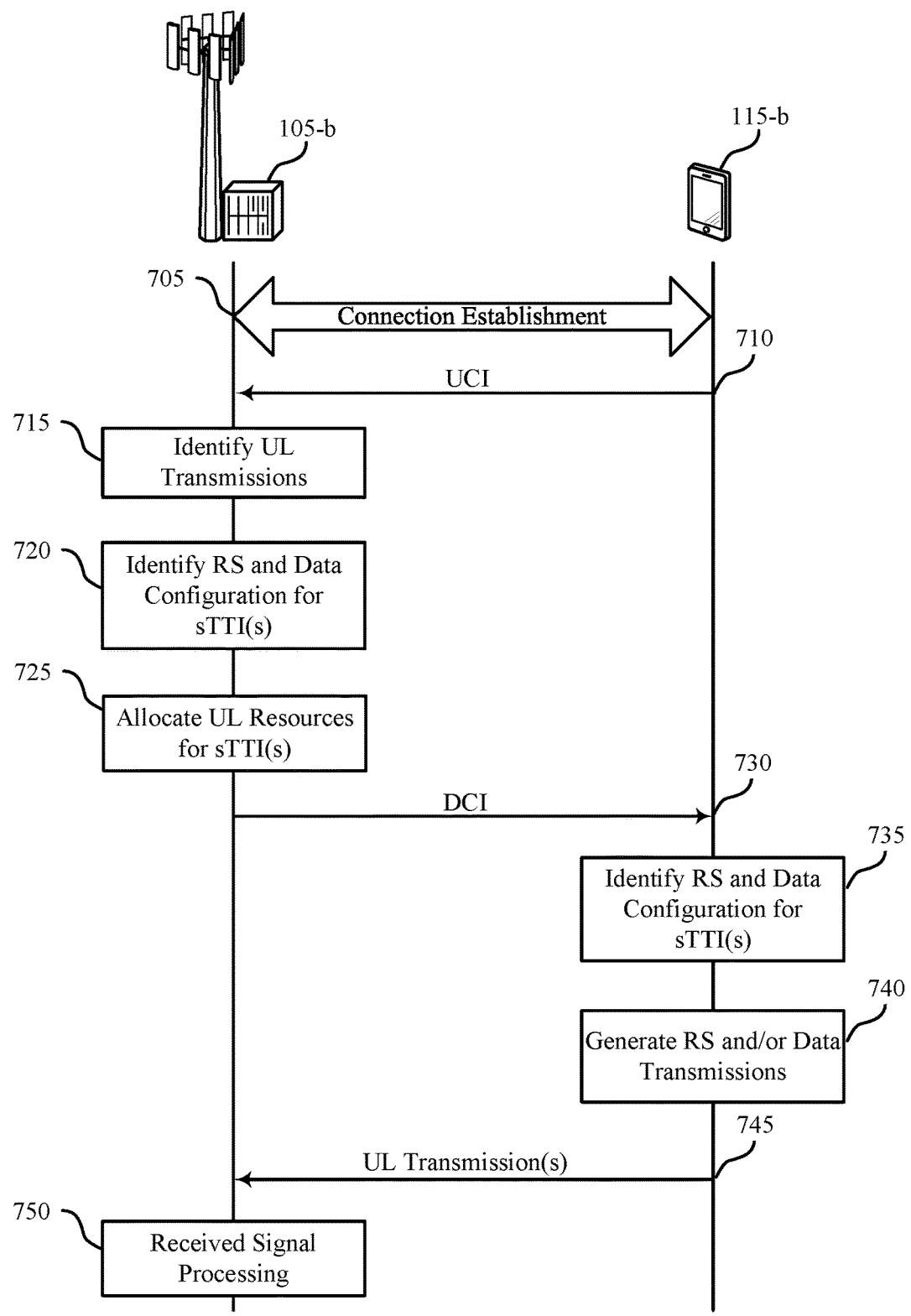
FIG. 7 illustrates an example of a process flow that supports configuration for data and reference signal transmissions with sTTIs in accordance with aspects of the present disclosure.

FIG. 7 illustrates an example of a process flow 700 for configuration for data and reference signal transmissions with sTTIs. Process flow 700 may include a base station 105-b, and a UE 115-b, which may be examples of the corresponding devices described with reference to FIG. 1-2. The base station 105-b and the UE 115-b may establish a connection 705 according to established connection establishment techniques for the wireless communications system. The UE 115-b may transmit, in some examples, uplink control information (UCI), which may include a buffer status report (BSR) that may indicate the presence of uplink data for transmission, and may also indicate that a service for the data is a low-latency service or other service that may use sTTIs.

At block 715, base station 105-b may identify uplink transmissions to be transmitted by the UE 115-a. For example, the base station 105-b may identify that the uplink data indicated by the UE 115-b may take a number of sTTIs to transmit, which may be determined based on various factors such as channel conditions between the base station 105-b and the UE 115-b, a MCS supported by the channel used for transmissions, a MIMO configuration, etc.

At block 720, the base station may identify a RS and data configuration for the one or more sTTIs. Such a RS configuration may be identified to provide unused symbols at certain locations within a subframe, to provide enhanced coverage or capacity of a sTTI, or to provide enhanced RS density for a sTTI, such as discussed above.

At block 725, the base station 105-b may allocate uplink resources for the identified sTTIs, which may include an allocation for at least a first sTTI in some examples. The allocation of resources may be determined based on a data that is in the UE buffer, a service associated with the data (e.g., URLLC data), and channel conditions associated with the UE 115-b. For example, if the UE 115-b is relatively close to the base station 105-b and traveling at a relatively low speed (or not at all), the base station 105-b may select a sequence that provides increased capacity. Alternatively, if the UE 115-b is relatively far from the base station 105-b (e.g., a cell-edge UE) and/or traveling at a relatively high rate of speed, the base station 105-b may select a RS configuration that may provide enhanced coverage for the sTTI.

The base station 105-b may transmit downlink control information (DCI) 730 to the UE 115-b. The DCI 730 may include, for example, a sPDCCH uplink grant that indicates allocated uplink resources for a particular sTTI and the RS configuration for the sTTI. In some cases, where UE 115-b is scheduled for multiple sTTIs, multiple uplink grants may be provided that dynamically schedule uplink RS configurations for the different sTTIs. Also, as indicated above, in some cases the base station 105-b may allocate resources to a second UE (not shown) to allow the second UE to transmit a RS concurrently with a DMRS of the UE 115-b. In such cases, the second UE may use a different cyclic shift or different interlace for the RS transmission than the UE 115-b.

At block 735, the UE 115-a may identify the RS and data configuration for the sTTI(s). For example, the UE 115-a may receive the DCI 730 that includes an allocation of uplink resources for a first sTTI and an indication of the DMRS configuration for the first sTTI.

At block 740, the UE 115-b may generate the RS and/or data transmissions for the sTTI. The data transmissions and/or RS may be generated based on the allocated resources from an uplink grant provided in the DCI 730, for example. UE 115-b may then transmit uplink transmission(s) 745 to the base station 105-b, which may perform received signal processing at block 750. Such processing may include demodulating the uplink transmissions 745 using a transmitted DMRS from a sTTI or from one or more previously received sTTIs. In some cases, such processing may include acknowledgment feedback processing (e.g., HARQ feedback).

Figure 8:
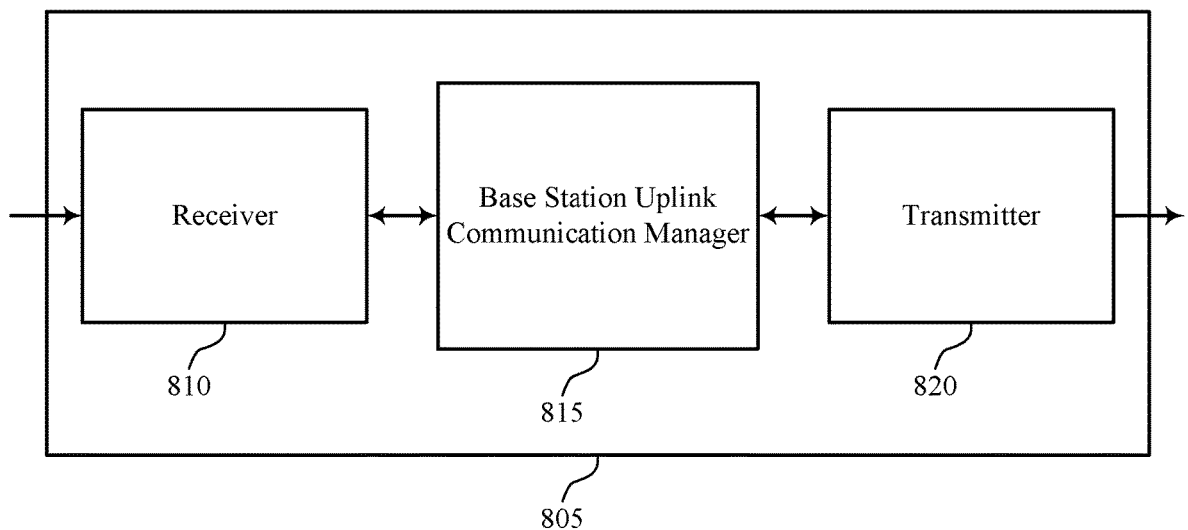
FIGS. 8 through 10 show block diagrams of a device that supports configuration for data and reference signal transmissions with sTTIs in accordance with aspects of the present disclosure.

FIG. 8 shows a block diagram 800 of a wireless device 805 that supports configuration for data and reference signal transmissions with sTTIs in accordance with various aspects of the present disclosure. Wireless device 805 may be an example of aspects of a base station 105 as described with reference to FIG. 1. Wireless device 805 may include receiver 810, base station uplink communication manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to configuration for data and reference signal transmissions with sTTIs, etc.). Information may be passed on to other components of the device. The receiver 810 may be an example of aspects of the transceiver 1135 described with reference to FIG. 11.

Base station uplink communication manager 815 may be an example of aspects of the base station uplink communication manager 1115 described with reference to FIG. 11.

Base station uplink communication manager 815 and/or at least some of its various sub-components may be implemented in hardware, software executed by a processor, firmware, or any combination thereof. If implemented in software executed by a processor, the functions of the base station uplink communication manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. In some examples, base station uplink communication manager 815 and/or at least some of its various sub-components may be a separate and distinct component in accordance with various aspects of the present disclosure. In other examples, base station uplink communication manager 815 and/or at least some of its various sub-components may be combined with one or more other hardware components, including but not limited to a receiver, a transmitter, a transceiver, one or more other components described in the present disclosure, or a combination thereof in accordance with various aspects of the present disclosure.

Base station uplink communication manager 815 may allocate uplink resources for an uplink control channel transmission in a first TTI including three OFDM symbols within a slot of a subframe, identify a RS configuration for the first TTI, and transmit an uplink grant for the uplink control channel transmission to a UE, the uplink grant including an indication of at least one of the allocated uplink resources for the first TTI and the RS configuration.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may include a single antenna, or it may include a set of antennas.

Figure 9:
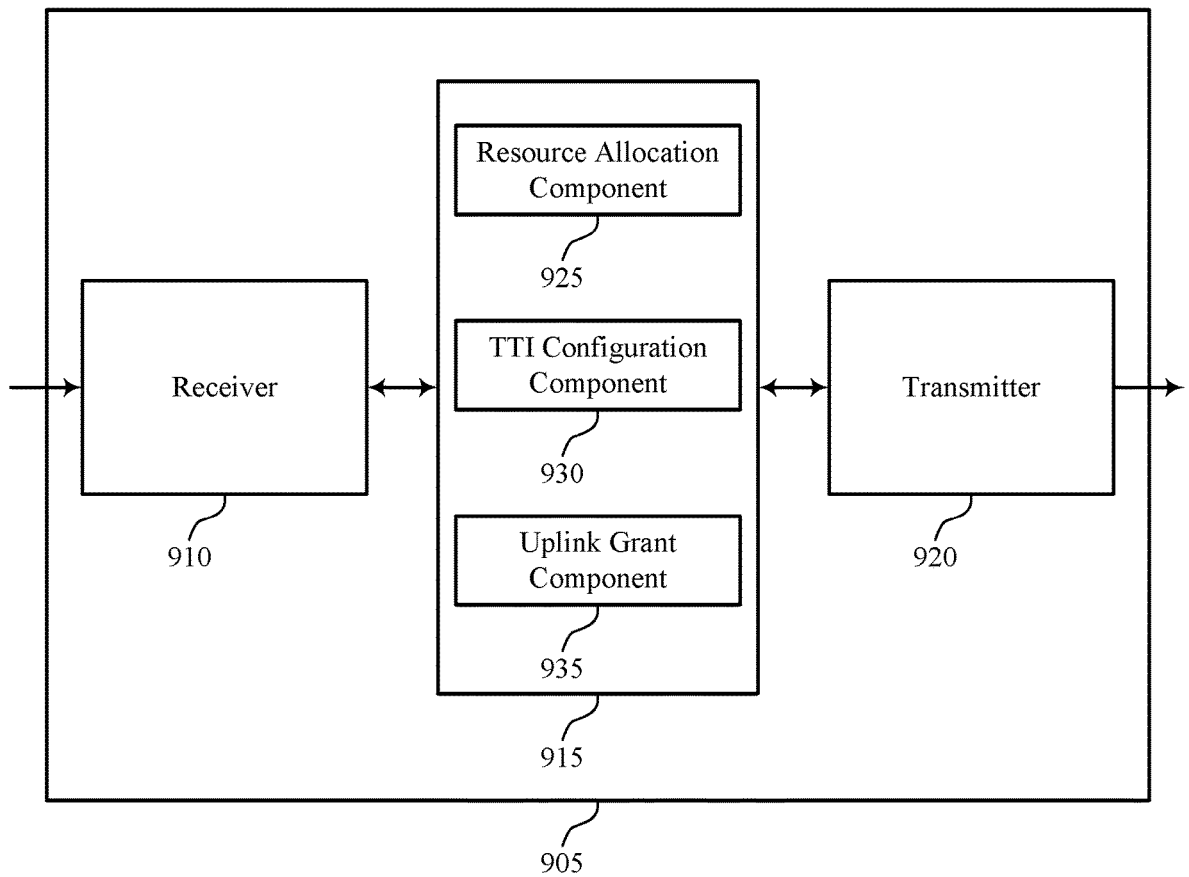

FIG. 9 shows a block diagram 900 of a wireless device 905 that supports configuration for data and reference signal transmissions with sTTIs in accordance with various aspects of the present disclosure. Wireless device 905 may be an example of aspects of a wireless device 805 or a base station 105 as described with reference to FIGS. 1 and 8. Wireless device 905 may include receiver 910, base station uplink communication manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to configuration for data and reference signal transmissions with sTTIs, etc.). Information may be passed on to other components of the device. The receiver 910 may be an example of aspects of the transceiver 1135 described with reference to FIG. 11.

Base station uplink communication manager 915 may be an example of aspects of the base station uplink communication manager 1115 described with reference to FIG. 11. Base station uplink communication manager 915 may also include resource allocation component 925, TTI configuration component 930, and uplink grant component 935.

Resource allocation component 925 may allocate uplink resources for an uplink control channel transmission in a first TTI including three OFDM symbols within a slot of a subframe and in some cases may determine whether the first TTI is located at a beginning of the subframe or located at an end of the subframe. TTI configuration component 930 may identify a RS configuration for the first TTI. TTI configuration component 930 may, for example, select an initial symbol of the first TTI as an unused symbol responsive to determining that the first TTI is located at the beginning of the subframe, select a last symbol of the first TTI as the unused symbol responsive to determining that the first TTI is located at the end of the subframe, or select either the initial symbol or the last symbol of the first TTI as the unused symbol responsive to determining that the first TTI is not located at the beginning or the end of the subframe. In some cases, TTI configuration component 930 may configure the first TTI with a first number of HARQ bundling operations, and configure a second TTI including two OFDM symbols within the slot of the subframe with a second number of HARQ bundling operations that is larger than the first number of HARQ bundling operations. In some cases, TTI configuration component 930 may configure the first TTI with a first number of feedback acknowledgment bits, and configure the second TTI with a second number of feedback acknowledgment bits that is smaller than the first number of feedback acknowledgment bits.

In some cases, the identifying the reference signal configuration includes configuring a first OFDM symbol of the first TTI for a RS transmission of the UE and configuring a second OFDM symbol of the first TTI for a RS transmission of a second UE, or configuring a first interlace of each of the first OFDM symbol and the second OFDM symbol of the first TTI for a RS transmission of the UE and configuring a second interlace of each of the first OFDM symbol and the second ODFM symbol of the first TTI for a RS transmission of a second UE. In some cases, the identifying the RS configuration includes identifying two data symbols and one RS symbol. In some cases, the two data symbols are configured to carry redundant information. In some cases, the RS configuration indicates one or more OFDM symbol locations within the first TTI that are to be used for a data transmissions and one or more OFDM symbol locations within the first TTI that are to be used for a DMRS transmission. In some cases, the two data symbols are configured to carry non-redundant information. In some cases, the identifying the reference signal configuration includes identifying a higher density RS configuration for the first TTI relative to a lower density RS configuration of a second TTI within the slot of the subframe that has two OFDM symbols. In some cases, the two data symbols are self-decodable.

Uplink grant component 935 may transmit an uplink grant for the uplink control channel transmission to a UE, the uplink grant including an indication of at least one of the allocated uplink resources for the first TTI and the RS configuration.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may include a single antenna, or it may include a set of antennas.

Figure 10:
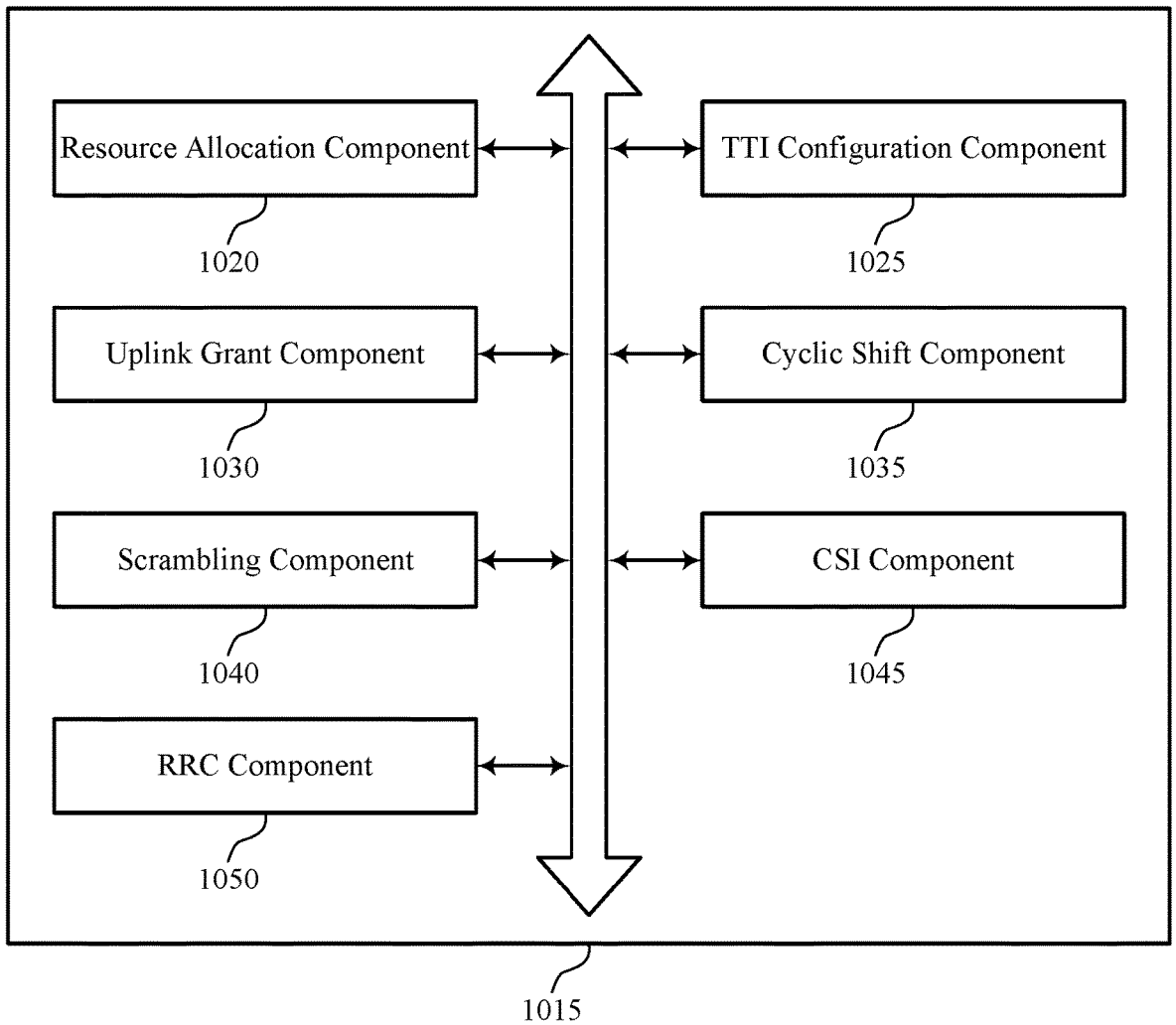

FIG. 10 shows a block diagram 1000 of a base station uplink communication manager 1015 that supports configuration for data and reference signal transmissions with sTTIs in accordance with various aspects of the present disclosure. The base station uplink communication manager 1015 may be an example of aspects of a base station uplink communication manager 815, a base station uplink communication manager 915, or a base station uplink communication manager 1115 described with reference to FIGS. 8, 9, and 11. The base station uplink communication manager 1015 may include resource allocation component 1020, TTI configuration component 1025, uplink grant component 1030, cyclic shift component 1035, scrambling component 1040, channel state information (CSI) component 1045, and radio resource control (RRC) component 1050. Each of these modules may communicate, directly or indirectly, with one another (e.g., via one or more buses).

Resource allocation component 1020 may allocate uplink resources for an uplink control channel transmission in a first TTI including three OFDM symbols within a slot of a subframe and determine whether the first TTI is located at a beginning of the subframe or located at an end of the subframe.

TTI configuration component 1025 may identify a RS configuration for the first TTI. TTI configuration component 1025 may, for example, select an initial symbol of the first TTI as an unused symbol responsive to determining that the first TTI is located at the beginning of the subframe, select a last symbol of the first TTI as the unused symbol responsive to determining that the first TTI is located at the end of the subframe, or select either the initial symbol or the last symbol of the first TTI as the unused symbol responsive to determining that the first TTI is not located at the beginning or the end of the subframe. In some cases, TTI configuration component 1025 may configure the first TTI with a first number of HARQ bundling operations, and configure a second TTI including two OFDM symbols within the slot of the subframe with a second number of HARQ bundling operations that is larger than the first number of HARQ bundling operations. In some cases, TTI configuration component 1025 may configure the first TTI with a first number of feedback acknowledgment bits, and configure the second TTI with a second number of feedback acknowledgment bits that is smaller than the first number of feedback acknowledgment bits.

In some cases, the identifying the reference signal configuration includes configuring a first OFDM symbol of the first TTI for a RS transmission of the UE and configuring a second OFDM symbol of the first TTI for a RS transmission of a second UE, or configuring a first interlace of each of the first OFDM symbol and the second OFDM symbol of the first TTI for a RS transmission of the UE and configuring a second interlace of each of the first OFDM symbol and the second ODFM symbol of the first TTI for a RS transmission of a second UE. In some cases, the identifying the RS configuration includes identifying two data symbols and one RS symbol. In some cases, the two data symbols are configured to carry redundant information. In some cases, the RS configuration indicates one or more OFDM symbol locations within the first TTI that are to be used for a data transmissions and one or more OFDM symbol locations within the first TTI that are to be used for a DMRS transmission. In some cases, the two data symbols are configured to carry non-redundant information. In some cases, the identifying the reference signal configuration includes identifying a higher density RS configuration for the first TTI relative to a lower density RS configuration of a second TTI within the slot of the subframe that has two OFDM symbols. In some cases, the two data symbols are self-decodable.

Uplink grant component 1030 may transmit an uplink grant for the uplink control channel transmission to a UE, the uplink grant including an indication of at least one of the allocated uplink resources for the first TTI and the RS configuration.

Cyclic shift component 1035 may provide a cyclic shift for two data symbols to provide a first data symbol configured to transmit control data using a first cyclically shifted sequence and a second data symbol configured to transmit the same control data using a second cyclically shifted sequence.

Scrambling component 1040 may provide scrambling of uplink data such that the two data symbols include a first data symbol configured to transmit control data using a first scrambling sequence and a second data symbol configured to transmit the same control data using a second scrambling sequence.

CSI component 1045 may configure a three-symbol TTI with a rich CSI process and configure a two-symbol TTI with a constrained CSI process. RRC component 1050 may provide RRC signaling of the RS configuration to a UE.

Figure 11:
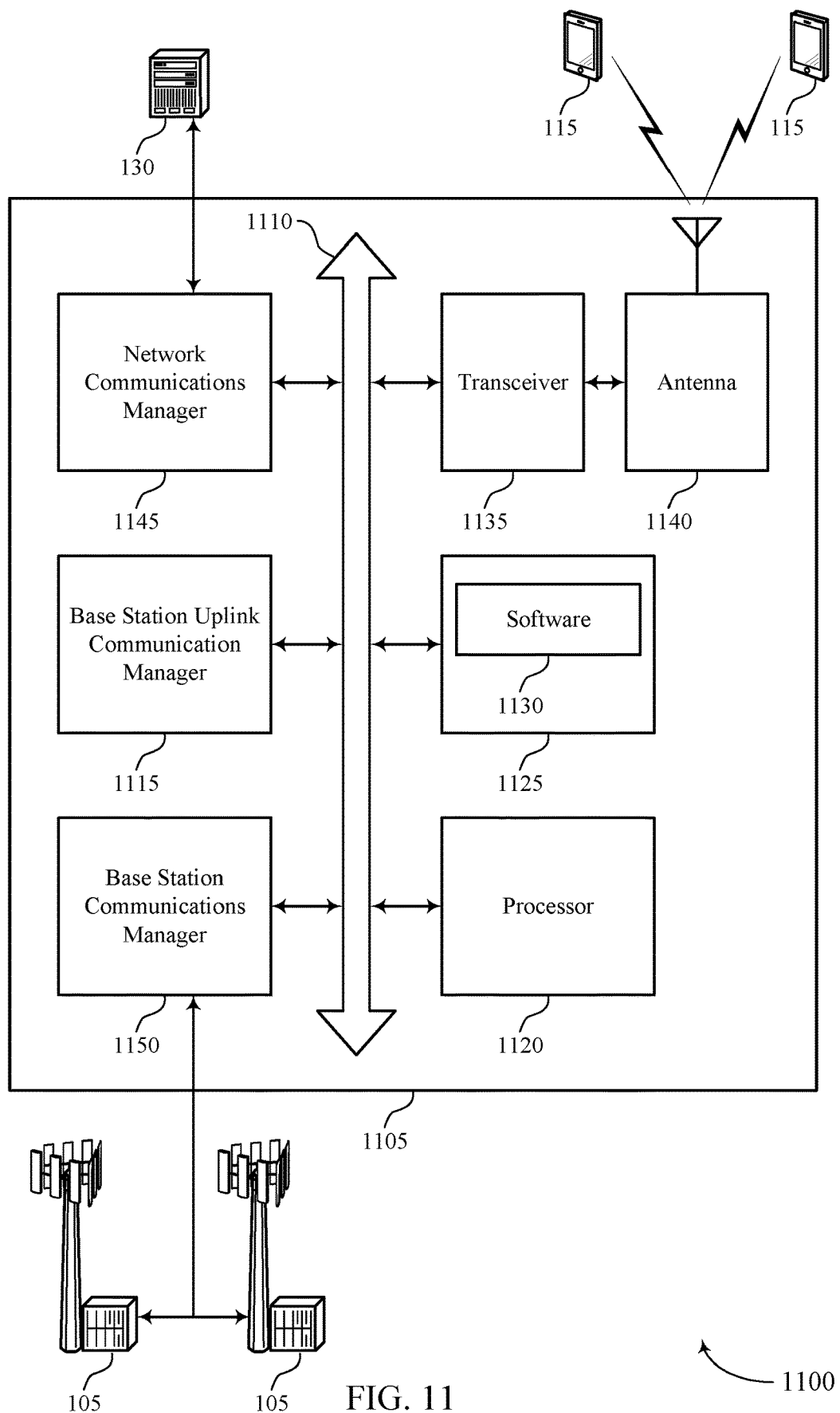
FIG. 11 illustrates a block diagram of a system including a base station that supports configuration for data and reference signal transmissions with sTTIs in accordance with aspects of the present disclosure.

FIG. 11 shows a diagram of a system 1100 including a device 1105 that supports configuration for data and reference signal transmissions with sTTIs in accordance with various aspects of the present disclosure. Device 1105 may be an example of or include the components of wireless device 805, wireless device 905, or a base station 105 as described above, e.g., with reference to FIGS. 1, 8 and 9. Device 1105 may include components for bi-directional voice and data communications including components for transmitting and receiving communications, including base station uplink communication manager 1115, processor 1120, memory 1125, software 1130, transceiver 1135, antenna 1140, network communications manager 1145, and base station communications manager 1150. These components may be in electronic communication via one or more busses (e.g., bus 1110). Device 1105 may communicate wirelessly with one or more UEs 115.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting configuration for data and reference signal transmissions with sTTIs).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware and/or software operation such as the interaction with peripheral components or devices.

Software 1130 may include code to implement aspects of the present disclosure, including code to support configuration for data and reference signal transmissions with sTTIs. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

Network communications manager 1145 may manage communications with the core network (e.g., via one or more wired backhaul links). For example, the network communications manager 1145 may manage the transfer of data communications for client devices, such as one or more UEs 115.

Base station communications manager 1150 may manage communications with other base station 105, and may include a controller or scheduler for controlling communications with UEs 115 in cooperation with other base stations 105. For example, the base station communications manager 1150 may coordinate scheduling for transmissions to UEs 115 for various interference mitigation techniques such as beamforming or joint transmission. In some examples, base station communications manager 1150 may provide an X2 interface within an Long Term Evolution (LTE)/LTE-A wireless communication network technology to provide communication between base stations 105.

Figure 12:
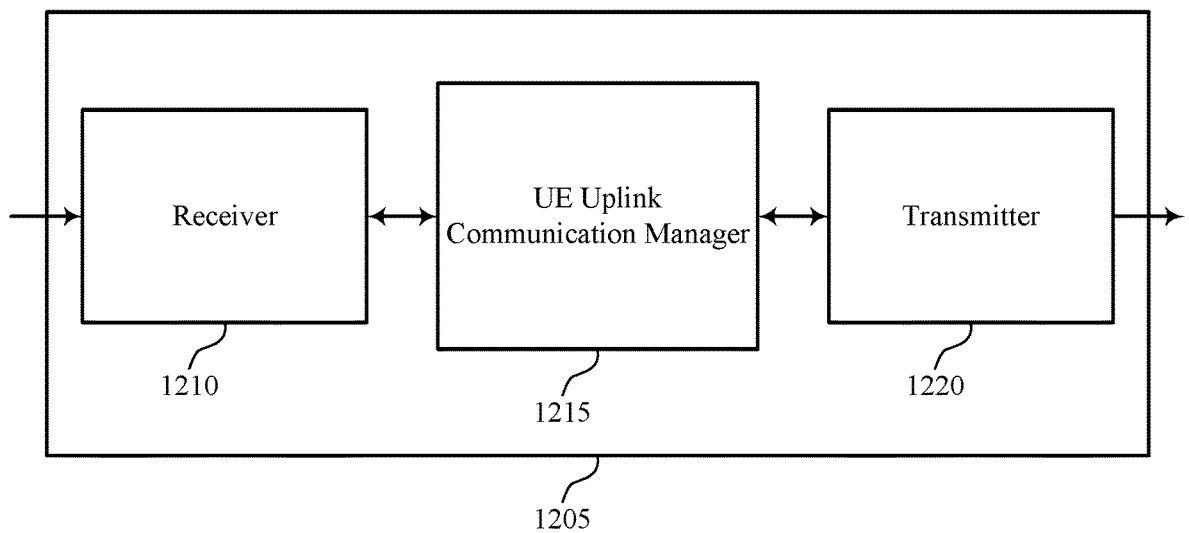
FIGS. 12 through 14 show block diagrams of a device that supports configuration for data and reference signal transmissions with sTTIs in accordance with aspects of the present disclosure.

FIG. 12 shows a block diagram 1200 of a wireless device 1205 that supports configuration for data and reference signal transmissions with sTTIs in accordance with various aspects of the present disclosure. Wireless device 1205 may be an example of aspects of a UE 115 as described with reference to FIG. 1. Wireless device 1205 may include receiver 1210, UE uplink communication manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to configuration for data and reference signal transmissions with sTTIs, etc.). Information may be passed on to other components of the device. The receiver 1210 may be an example of aspects of the transceiver 1535 described with reference to FIG. 15.

UE uplink communication manager 1215 may be an example of aspects of the UE uplink communication manager 1515 described with reference to FIG. 15.

UE uplink communication manager 1215 and/or at least some of its various sub-components may be implemented in hardware, software executed by a processor, firmware, or any combination thereof. If implemented in software executed by a processor, the functions of the UE uplink communication manager 1215 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. In some examples, UE uplink communication manager 1215 and/or at least some of its various sub-components may be a separate and distinct component in accordance with various aspects of the present disclosure. In other examples, UE uplink communication manager 1215 and/or at least some of its various sub-components may be combined with one or more other hardware components, including but not limited to a receiver, a transmitter, a transceiver, one or more other components described in the present disclosure, or a combination thereof in accordance with various aspects of the present disclosure.

UE uplink communication manager 1215 may receive an allocation of uplink resources from a base station for a first TTI, the first TTI including three OFDM symbols within a slot of a radio subframe, identify a RS and data configuration for the first TTI, and transmit a RS and data to the base station using the allocated uplink resources based on the RS and data configuration.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may include a single antenna, or it may include a set of antennas.

Figure 13:
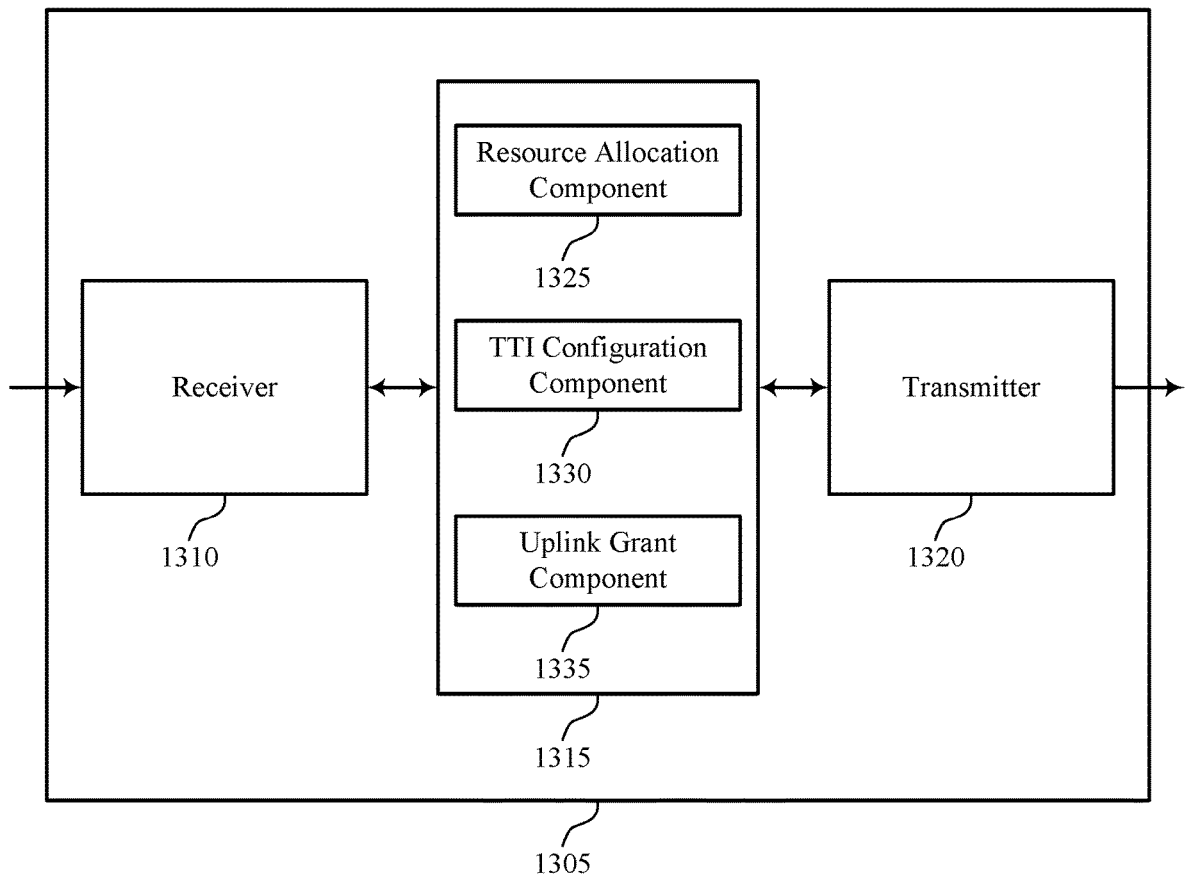

FIG. 13 shows a block diagram 1300 of a wireless device 1305 that supports configuration for data and reference signal transmissions with sTTIs in accordance with various aspects of the present disclosure. Wireless device 1305 may be an example of aspects of a wireless device 1205 or a UE 115 as described with reference to FIGS. 1 and 12. Wireless device 1305 may include receiver 1310, UE uplink communication manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to configuration for data and reference signal transmissions with sTTIs, etc.). Information may be passed on to other components of the device. The receiver 1310 may be an example of aspects of the transceiver 1535 described with reference to FIG. 15.

UE uplink communication manager 1315 may be an example of aspects of the UE uplink communication manager 1515 described with reference to FIG. 15. UE uplink communication manager 1315 may also include resource allocation component 1325, TTI configuration component 1330, and uplink grant component 1335.

Resource allocation component 1325 may receive an allocation of uplink resources from a base station for a first TTI, the first TTI including three OFDM symbols within a slot of a radio subframe.

TTI configuration component 1330 may identify a RS and data configuration for the first TTI. In some cases, the identifying the RS configuration includes identifying one data symbol, one RS symbol and one unused symbol within the first TTI. In some cases, an initial symbol of the first TTI is the unused symbol when the first TTI is located at the beginning of the subframe, a last symbol of the first TTI is the unused symbol when the first TTI is located at an end of the subframe, or either the initial symbol or the last symbol of the first TTI is the unused symbol when the first TTI is not located at the beginning or the end of the subframe. In some cases, the identifying the RS configuration includes identifying two data symbols and one RS symbol. In some cases, the RS configuration indicates one or more OFDM symbol locations within the first TTI that are to be used for a data transmissions and one or more OFDM symbol locations within the first TTI that are to be used for a DMRS transmission. In some cases, the two data symbols are self-decodable. In some cases, the two data symbols are configured to carry non-redundant information. In some cases, the two data symbols are configured to carry redundant information.

Uplink grant component 1335 may identify resources for the UE to transmit a RS and data to the base station using the allocated uplink resources based on the RS and data configuration. In some cases, the RS configuration is received as part of the allocation of uplink resources.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may include a single antenna, or it may include a set of antennas.

Figure 14:
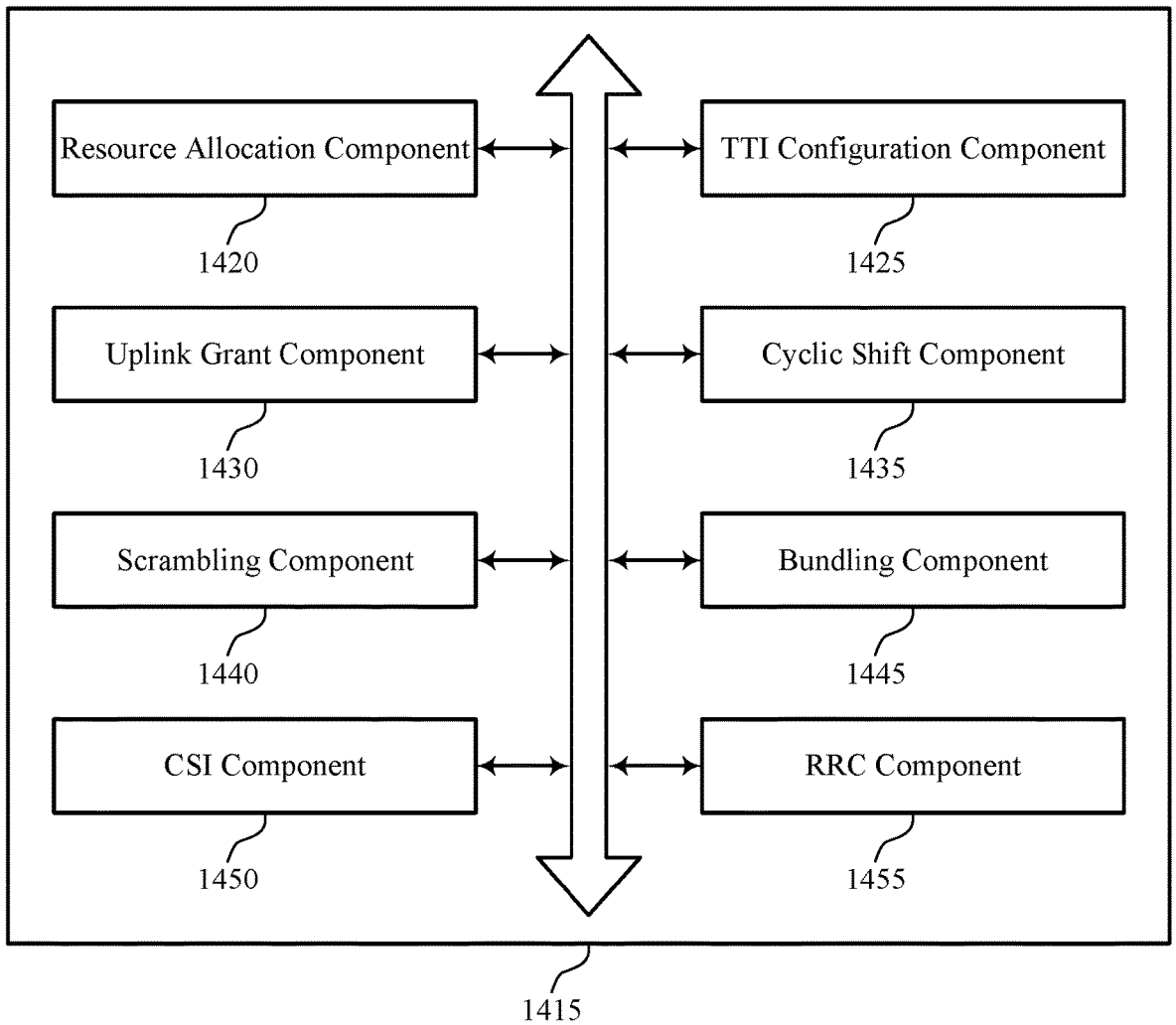

FIG. 14 shows a block diagram 1400 of a UE uplink communication manager 1415 that supports configuration for data and reference signal transmissions with sTTIs in accordance with various aspects of the present disclosure. The UE uplink communication manager 1415 may be an example of aspects of a UE uplink communication manager 1515 described with reference to FIGS. 12, 13, and 15. The UE uplink communication manager 1415 may include resource allocation component 1420, TTI configuration component 1425, uplink grant component 1430, cyclic shift component 1435, scrambling component 1440, bundling component 1445, CSI component 1450, and RRC component 1455. Each of these modules may communicate, directly or indirectly, with one another (e.g., via one or more buses).

Resource allocation component 1420 may receive an allocation of uplink resources from a base station for a first TTI, the first TTI including three OFDM symbols within a slot of a radio subframe.

TTI configuration component 1425 may identify a RS and data configuration for the first TTI. In some cases, the identifying the RS configuration includes identifying one data symbol, one RS symbol and one unused symbol within the first TTI. In some cases, an initial symbol of the first TTI is the unused symbol when the first TTI is located at the beginning of the subframe, a last symbol of the first TTI is the unused symbol when the first TTI is located at an end of the subframe, or either the initial symbol or the last symbol of the first TTI is the unused symbol when the first TTI is not located at the beginning or the end of the subframe. In some cases, the identifying the RS configuration includes identifying two data symbols and one RS symbol. In some cases, the RS configuration indicates one or more OFDM symbol locations within the first TTI that are to be used for a data transmissions and one or more OFDM symbol locations within the first TTI that are to be used for a DMRS transmission. In some cases, the two data symbols are self-decodable. In some cases, the two data symbols are configured to carry non-redundant information. In some cases, the two data symbols are configured to carry redundant information.

Uplink grant component 1430 may transmit a RS and data to the base station using the allocated uplink resources based on the RS and data configuration. In some cases, the receiving further includes receiving the RS configuration as part of the allocation of uplink resources.

Cyclic shift component 1435 may apply cyclic shifts to two data symbols to provide a first data symbol with control data that is cyclically shifted using a first cyclical shift (CS) and a second data symbol with the same control data that is cyclically shifted using a second CS that is different than the first CS.

Scrambling component 1440 may apply scrambling sequences to two data symbols to provide a first data symbol with control data that is scrambled using a first scrambling sequence and a second data symbol with the same control data that is scrambled using a second scrambling sequence.

Bundling component 1445 may transmit the first TTI using a first number of HARQ bundling operations and transmit a second TTI including two OFDM symbols within the slot of the subframe using a second number of HARQ bundling operations that is larger than the first number of HARQ bundling operations.

CSI component 1450 may transmit the first TTI with a rich CSI process and transmit the second TTI with a constrained CSI process. RRC component 1455 may receive RRC signaling including the RS configuration.

Figure 15:
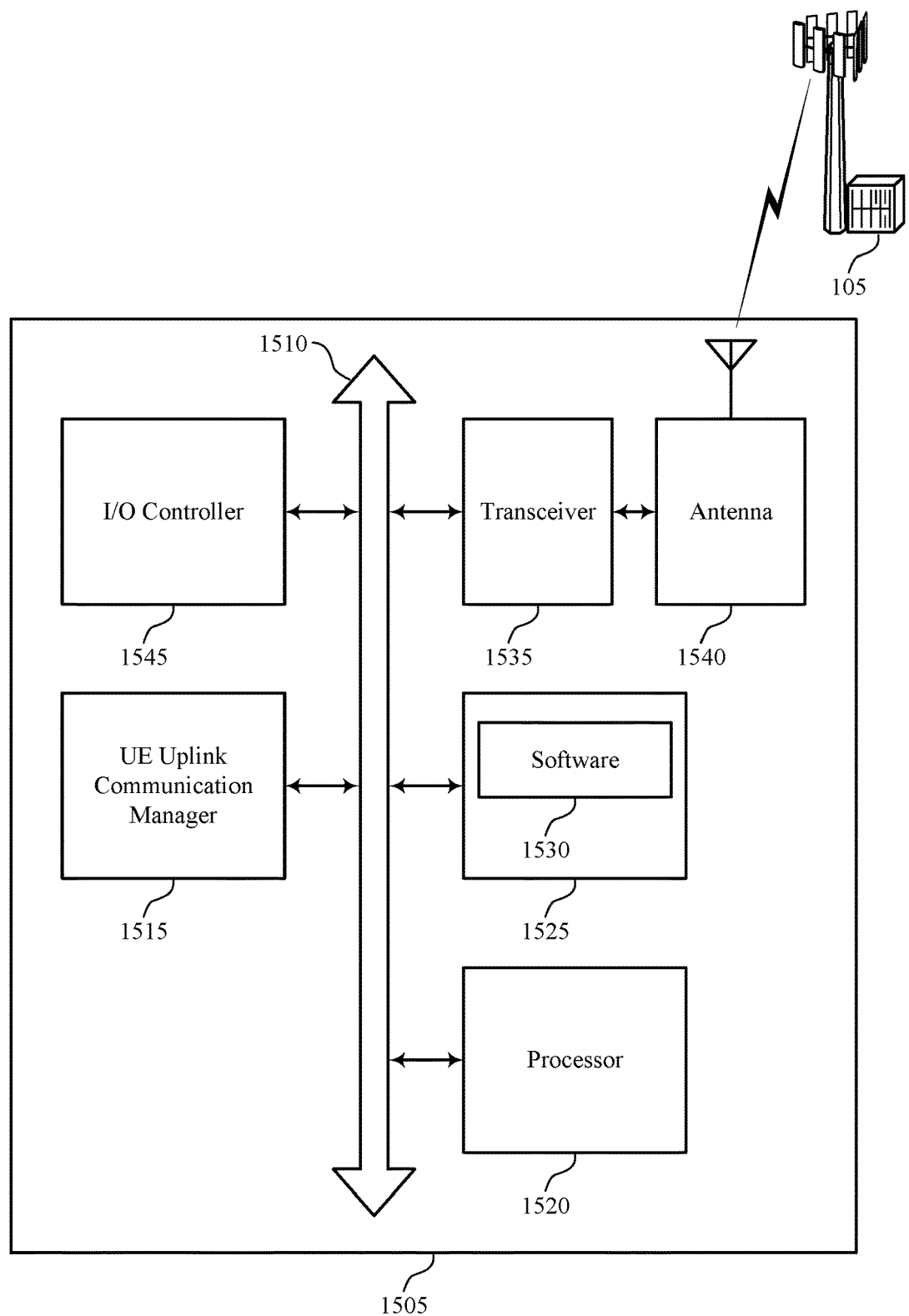
FIG. 15 illustrates a block diagram of a system including a UE that supports configuration for data and reference signal transmissions with sTTIs in accordance with aspects of the present disclosure.

FIG. 15 shows a diagram of a system 1500 including a device 1505 that supports configuration for data and reference signal transmissions with sTTIs in accordance with various aspects of the present disclosure. Device 1505 may be an example of or include the components of UE 115 as described above, e.g., with reference to FIG. 1. Device 1505 may include components for bi-directional voice and data communications including components for transmitting and receiving communications, including UE uplink communication manager 1515, processor 1520, memory 1525, software 1530, transceiver 1535, antenna 1540, and I/O controller 1545. These components may be in electronic communication via one or more busses (e.g., bus 1510). Device 1505 may communicate wirelessly with one or more base stations 105.

Processor 1520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting configuration for data and reference signal transmissions with sTTIs).

Memory 1525 may include RAM and ROM. The memory 1525 may store computer-readable, computer-executable software 1530 including instructions that, when executed, cause the processor to perform various functions described herein. In some cases, the memory 1525 may contain, among other things, a BIOS which may control basic hardware and/or software operation such as the interaction with peripheral components or devices.

Software 1530 may include code to implement aspects of the present disclosure, including code to support configuration for data and reference signal transmissions with sTTIs. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases the device may have more than one antenna 1540, which may be capable of concurrently transmitting or receiving multiple wireless transmissions.

I/O controller 1545 may manage input and output signals for device 1505. I/O controller 1545 may also manage peripherals not integrated into device 1505. In some cases, I/O controller 1545 may represent a physical connection or port to an external peripheral. In some cases, I/O controller 1545 may utilize an operating system such as iOS®, ANDROID®, MS-DOS®, MS-WINDOWS®, OS/2®, UNIX®, LINUX®, or another known operating system.

Figure 16:
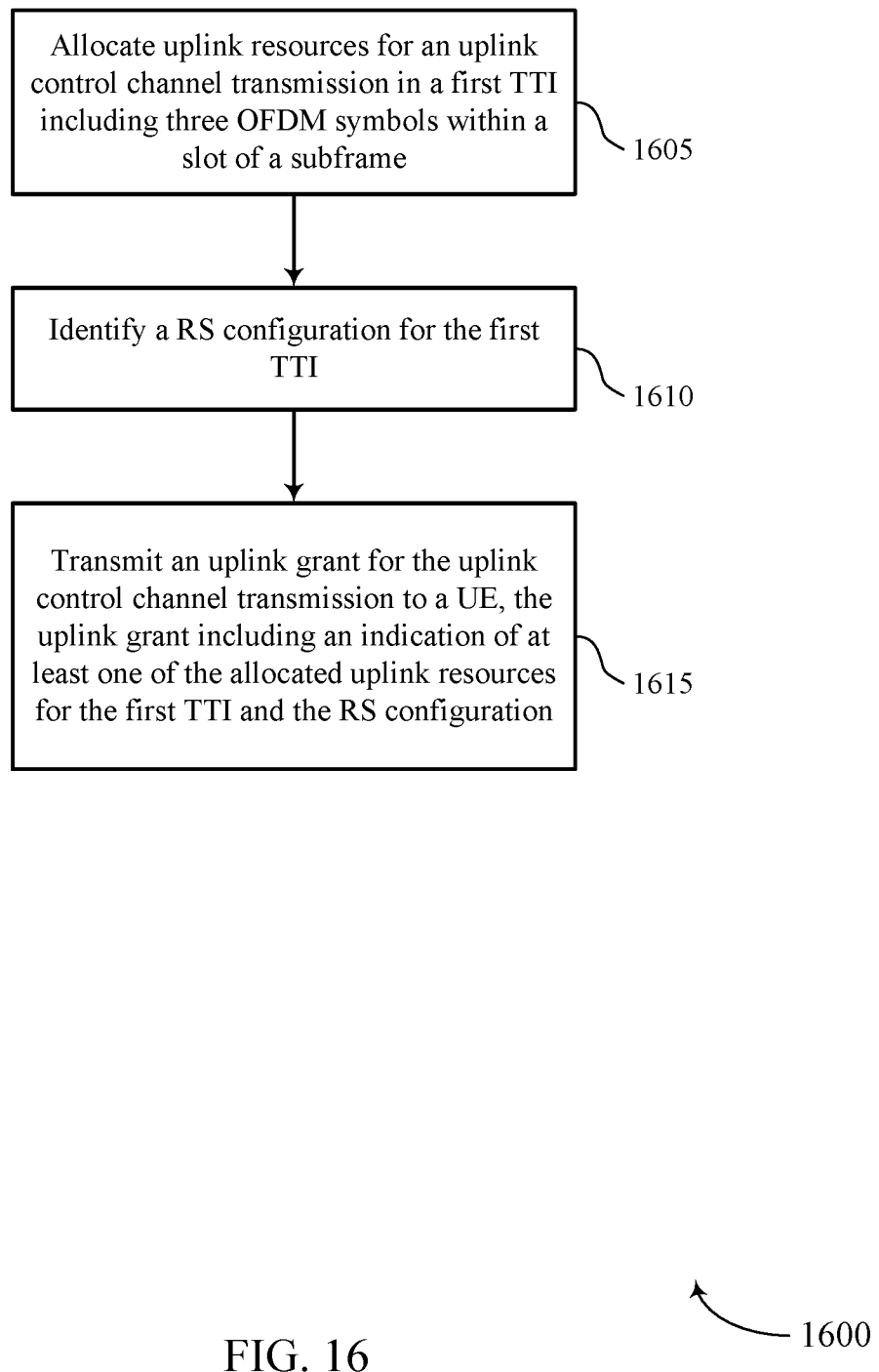
FIGS. 16 through 18 illustrate methods for configuration for data and reference signal transmissions with sTTIs in accordance with aspects of the present disclosure.

FIG. 16 shows a flowchart illustrating a method 1600 for configuration for data and reference signal transmissions with sTTIs in accordance with various aspects of the present disclosure. The operations of method 1600 may be implemented by a base station 105 or its components as described herein. For example, the operations of method 1600 may be performed by a base station uplink communication manager as described with reference to FIGS. 8 through 11. In some examples, a base station 105 may execute a set of codes to control the functional elements of the device to perform the functions described below. Additionally or alternatively, the base station 105 may perform aspects the functions described below using special-purpose hardware.

At block 1605 the base station 105 may allocate uplink resources for an uplink control channel transmission in a first TTI comprising three OFDM symbols within a slot of a subframe. The operations of block 1605 may be performed according to the methods described with reference to FIGS. 1 through 7. In certain examples, aspects of the operations of block 1605 may be performed by a resource allocation component as described with reference to FIGS. 8 through 11.

At block 1610 the base station 105 may identify a RS configuration for the first TTI. The operations of block 1610 may be performed according to the methods described with reference to FIGS. 1 through 7. In certain examples, aspects of the operations of block 1610 may be performed by a TTI configuration component as described with reference to FIGS. 8 through 11.

At block 1615 the base station 105 may transmit an uplink grant for the uplink control channel transmission to a UE, the uplink grant including an indication of at least one of the allocated uplink resources for the first TTI and the RS configuration. The operations of block 1615 may be performed according to the methods described with reference to FIGS. 1 through 7. In certain examples, aspects of the operations of block 1615 may be performed by a uplink grant component as described with reference to FIGS. 8 through 11.

Figure 17:
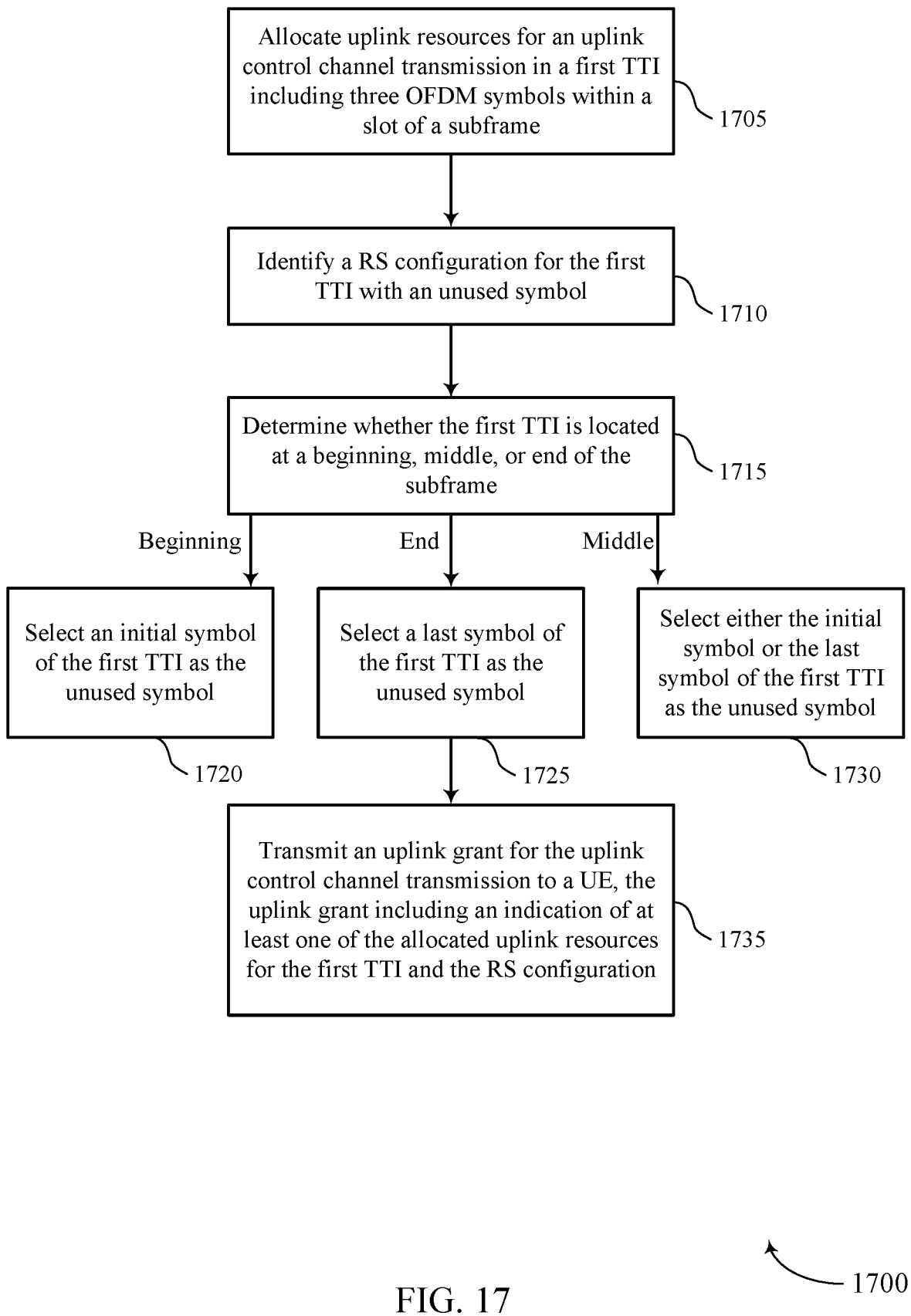

FIG. 17 shows a flowchart illustrating a method 1700 for configuration for data and reference signal transmissions with sTTIs in accordance with various aspects of the present disclosure. The operations of method 1700 may be implemented by a base station 105 or its components as described herein. For example, the operations of method 1700 may be performed by a base station uplink communication manager as described with reference to FIGS. 8 through 11. In some examples, a base station 105 may execute a set of codes to control the functional elements of the device to perform the functions described below. Additionally or alternatively, the base station 105 may perform aspects the functions described below using special-purpose hardware.

At block 1705 the base station 105 may allocate uplink resources for an uplink control channel transmission in a first TTI comprising three OFDM symbols within a slot of a subframe. The operations of block 1705 may be performed according to the methods described with reference to FIGS. 1 through 7. In certain examples, aspects of the operations of block 1705 may be performed by a resource allocation component as described with reference to FIGS. 8 through 11.

At block 1710 the base station 105 may identify a RS configuration for the first TTI with an unused symbol. The operations of block 1710 may be performed according to the methods described with reference to FIGS. 1 through 7. In certain examples, aspects of the operations of block 1710 may be performed by a TTI configuration component as described with reference to FIGS. 8 through 11.

At block 1715 the base station 105 may determine whether the first TTI is located at a beginning of the subframe or located at an end of the subframe. The operations of block 1715 may be performed according to the methods described with reference to FIGS. 1 through 7. In certain examples, aspects of the operations of block 1715 may be performed by a resource allocation component as described with reference to FIGS. 8 through 11.

At block 1720 the base station 105 may select an initial symbol of the first TTI as the unused symbol responsive to determining that the first TTI is located at the beginning of the subframe. The operations of block 1720 may be performed according to the methods described with reference to FIGS. 1 through 7. In certain examples, aspects of the operations of block 1720 may be performed by a TTI configuration component as described with reference to FIGS. 8 through 11.

At block 1725 the base station 105 may select a last symbol of the first TTI as the unused symbol responsive to determining that the first TTI is located at the end of the subframe. The operations of block 1725 may be performed according to the methods described with reference to FIGS. 1 through 7. In certain examples, aspects of the operations of block 1725 may be performed by a TTI configuration component as described with reference to FIGS. 8 through 11.

At block 1730 the base station 105 may select either the initial symbol or the last symbol of the first TTI as the unused symbol responsive to determining that the first TTI is not located at the beginning or the end of the subframe. The operations of block 1730 may be performed according to the methods described with reference to FIGS. 1 through 7. In certain examples, aspects of the operations of block 1730 may be performed by a TTI configuration component as described with reference to FIGS. 8 through 11.

At block 1735 the base station 105 may transmit an uplink grant for the uplink control channel transmission to a UE, the uplink grant including an indication of at least one of the allocated uplink resources for the first TTI and the RS configuration. The operations of block 1735 may be performed according to the methods described with reference to FIGS. 1 through 7. In certain examples, aspects of the operations of block 1735 may be performed by a uplink grant component as described with reference to FIGS. 8 through 11.

Figure 18:
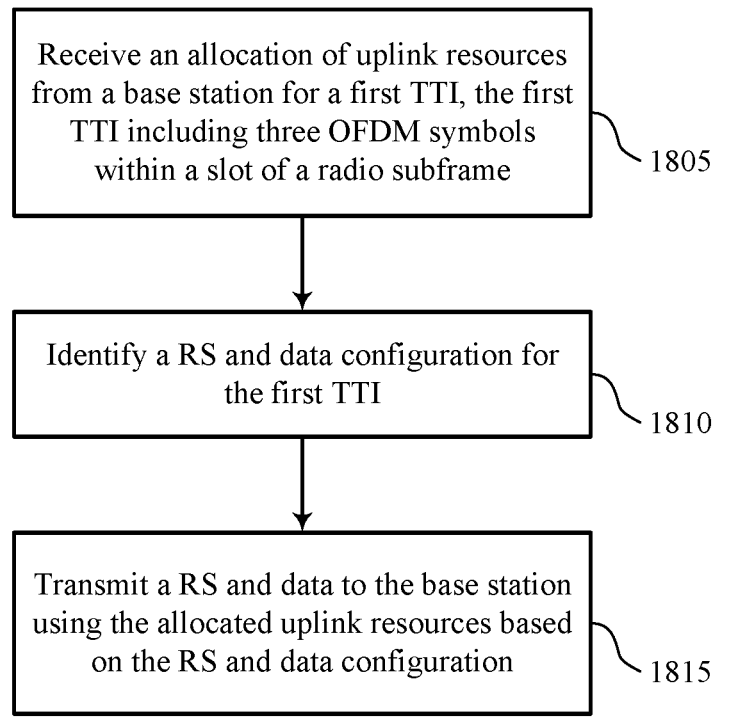

FIG. 18 shows a flowchart illustrating a method 1800 for configuration for data and reference signal transmissions with sTTIs in accordance with various aspects of the present disclosure. The operations of method 1800 may be implemented by a UE 115 or its components as described herein. For example, the operations of method 1800 may be performed by a UE uplink communication manager as described with reference to FIGS. 12 through 15. In some examples, a UE 115 may execute a set of codes to control the functional elements of the device to perform the functions described below. Additionally or alternatively, the UE 115 may perform aspects the functions described below using special-purpose hardware.

At block 1805 the UE 115 may receive an allocation of uplink resources from a base station for a first TTI, the first TTI comprising three OFDM symbols within a slot of a radio subframe. The operations of block 1805 may be performed according to the methods described with reference to FIGS. 1 through 7. In certain examples, aspects of the operations of block 1805 may be performed by a resource allocation component as described with reference to FIGS. 12 through 15.

At block 1810 the UE 115 may identify a RS and data configuration for the first TTI. The operations of block 1810 may be performed according to the methods described with reference to FIGS. 1 through 7. In certain examples, aspects of the operations of block 1810 may be performed by a TTI configuration component as described with reference to FIGS. 12 through 15.

At block 1815 the UE 115 may transmit a RS and data to the base station using the allocated uplink resources based at least in part on the RS and data configuration. The operations of block 1815 may be performed according to the methods described with reference to FIGS. 1 through 7. In certain examples, aspects of the operations of block 1815 may be performed by a uplink grant component as described with reference to FIGS. 12 through 15.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   allocating uplink resources for an uplink control channel transmission in a first transmission time interval (TTI) comprising three symbols within a slot of a subframe;
   identifying a reference signal (RS) configuration for the first TTI by identifying at least a first data symbol and a second data symbol, the second data symbol being configured to carry second data that is redundant of first data carried by the first data symbol; and
   transmitting an uplink grant for the uplink control channel transmission to a user equipment (UE), the uplink grant including an indication of the RS configuration and at least one of the allocated uplink resources for the first TTI.

2. The method of claim 1, wherein each of the data symbols is configured to transmit a same control data using a different cyclically shifted sequence.

3. The method of claim 1, wherein each of the data symbols is configured to transmit a same control data using a different scrambling sequence.

4. The method of claim 1, wherein the data symbols are self-decodable.

5. The method of claim 1, further comprising:
   configuring the first TTI with a first number of hybrid automatic repeat request (HARQ) bundling operations; and
   configuring a second TTI comprising two symbols within the slot of the subframe with a second number of HARQ bundling operations that is larger than the first number of HARQ bundling operations.

6. The method of claim 5, further comprising:
   configuring the first TTI with a first number of feedback acknowledgment bits; and
   configuring the second TTI with a second number of feedback acknowledgment bits that is smaller than the first number of feedback acknowledgment bits.

7. The method of claim 5, further comprising:
   configuring the first TTI with a rich channel state information (CSI) process; and
   configuring the second TTI with a constrained CSI process.

8. The method of claim 1, wherein the RS configuration is transmitted to a UE through radio resource control (RRC) signaling or in an uplink grant.

9. The method of claim 1, wherein the identifying the reference signal configuration comprises identifying a higher density RS configuration for the first TTI relative to a lower density RS configuration of a second TTI within the slot of the subframe that has two symbols.

10. A method for wireless communication, comprising:
    receiving an allocation of uplink resources from a base station for a first transmission time interval (TTI), the first TTI comprising three symbols within a slot of a radio subframe;
    receiving an indication of a reference signal (RS) and data configuration for the first TTI, the RS and data configuration identifying at least a first data symbol and a second data symbol, the second data symbol being configured to carry second data that is redundant of first data carried by the first data symbol; and
    transmitting data to the base station using the allocated uplink resources based at least in part on the RS and data configuration.

11. The method of claim 10, wherein each of the data symbols includes a same control data that is cyclically shifted using a different cyclical shift (CS).

12. The method of claim 10, wherein each of the data symbols includes a same control data that is scrambled using a different scrambling sequence.

13. The method of claim 10, wherein the data symbols are self-decodable.

14. The method of claim 10, further comprising:
    transmitting the first TTI using a first number of hybrid automatic repeat request (HARQ) bundling operations; and
    transmitting a second TTI comprising two symbols within the slot of the subframe using a second number of HARQ bundling operations that is larger than the first number of HARQ bundling operations.

15. The method of claim 14, further comprising:
    transmitting the first TTI with a first number of feedback acknowledgment bits; and
    transmitting the second TTI with a second number of feedback acknowledgment bits that is smaller than the first number of feedback acknowledgment bits.

16. The method of claim 14, further comprising:
    transmitting the first TTI with a rich channel state information (CSI) process; and
    transmitting the second TTI with a constrained CSI process.

17. The method of claim 10, further comprising:
    receiving radio resource control (RRC) signaling including the RS and data configuration.

18. The method of claim 10, wherein the receiving further comprises receiving the RS and data configuration as part of the allocation of uplink resources.

19. The method of claim 10, wherein the RS for the first TTI is a higher density RS than a lower density RS of a second TTI within the slot of the subframe that has two symbols.

20. An apparatus for wireless communication, comprising:
    hardware configured to allocate uplink resources for an uplink control channel transmission in a first transmission time interval (TTI) comprising three symbols within a slot of a subframe;
    hardware configured to identify a reference signal (RS) configuration for the first TTI by identifying at least a first data symbol and a second data symbol, the second data symbol being configured to carry second data that is redundant of first data carried by the first data symbol; and
    means for transmitting an uplink grant for the uplink control channel transmission to a UE, the uplink grant including an indication of the RS configuration and at least one of the allocated uplink resources for the first TTI.

21. An apparatus for wireless communication, comprising:
    means for receiving an allocation of uplink resources from a base station for a first transmission time interval (TTI), the first TTI comprising three symbols within a slot of a radio subframe;
    means for receiving an indication of a reference signal (RS) and data configuration for the first TTI, the RS and data configuration identifying at least a first data symbol and a second data symbol, the second data symbol being configured to carry second data that is redundant of first data carried by the first data symbol; and
    means for transmitting data to the base station using the allocated uplink resources based at least in part on the RS and data configuration.

22. An apparatus for wireless communication, in a system comprising:
- a processor;
- memory in electronic communication with the processor; and
- instructions stored in the memory and operable, when executed by the processor, to cause the apparatus to:
- allocate uplink resources for an uplink control channel transmission in a first transmission time interval (TTI) comprising three symbols within a slot of a subframe;
- identify a reference signal (RS) configuration for the first TTI by identifying at least a first data symbol and a second data symbol, the second data symbol being configured to carry second data that is redundant of first data carried by the first data symbol; and
- transmit an uplink grant for the uplink control channel transmission to a UE, the uplink grant including an indication of the RS configuration and at least one of the allocated uplink resources for the first TTI.

23. The apparatus of claim 22, wherein each of the data symbols is configured to transmit a same control data using a different cyclically shifted sequence.

24. The apparatus of claim 22, wherein each of the data symbols is configured to transmit a same control data using a different scrambling sequence.

25. An apparatus for wireless communication, in a system comprising:
- a processor;
- memory in electronic communication with the processor; and
- instructions stored in the memory and operable, when executed by the processor, to cause the apparatus to:
- receive an allocation of uplink resources from a base station for a first transmission time interval (TTI), the first TTI comprising three symbols within a slot of a radio subframe;
- receive an indication of a reference signal (RS) and data configuration for the first TTI, the RS and data configuration identifying at least a first data symbol and a second data symbol, the second data symbol being configured to carry second data that is redundant of first data carried by the first data symbol; and
- transmit data to the base station using the allocated uplink resources based at least in part on the RS and data configuration.

26. The apparatus of claim 25, wherein each of the data symbols includes a same control data that is cyclically shifted using a different cyclical shift (CS).

27. The apparatus of claim 25, wherein each of the data symbols includes a same control data that is scrambled using a different scrambling sequence.

28. A non-transitory computer readable medium storing code for wireless communication, the code comprising instructions executable by a processor to:
- allocate uplink resources for an uplink control channel transmission in a first transmission time interval (TTI) comprising three symbols within a slot of a subframe;
- identify a reference signal (RS) configuration for the first TTI by identifying at least a first data symbol and a second data symbol, the second data symbol being configured to carry second data that is redundant of first data carried by the first data symbol; and
- transmit an uplink grant for the uplink control channel transmission to a UE, the uplink grant including an indication of the RS configuration and at least one of the allocated uplink resources for the first TTI.

29. A non-transitory computer readable medium storing code for wireless communication, the code comprising instructions executable by a processor to:
- receive an allocation of uplink resources from a base station for a first transmission time interval (TTI), the first TTI comprising three symbols within a slot of a radio subframe;
- receive an indication of a reference signal (RS) and data configuration for the first TTI, the RS and data configuration identifying at least a first data symbol and a second data symbol, the second data symbol being configured to carry second data that is redundant of first data carried by the first data symbol; and
- transmit data to the base station using the allocated uplink resources based at least in part on the RS and data configuration.

* * * * *